United States Patent [19]

Ichimura et al.

[11] Patent Number: 4,939,898
[45] Date of Patent: Jul. 10, 1990

[54] EXHAUST SYSTEM FOR MULTI-CYLINDER INTERNAL COMBUSTION ENGINES AND METHOD FOR CONTROLLING SAME

[75] Inventors: Takashi Ichimura; Koji Takamatsu; Takayuki Konuma, all of Saitama; Takaaki Tsukui, Tokyo, all of Japan

[73] Assignee: Honda Giken Kogyo Kabushiki Kaisha, Tokyo, Japan

[21] Appl. No.: 307,015

[22] Filed: Feb. 6, 1989

[30] Foreign Application Priority Data

Feb. 5, 1988 [JP] Japan .................... 63-024029
May 13, 1988 [JP] Japan .................... 63-116498
Aug. 10, 1988 [JP] Japan .................... 63-199383
Aug. 30, 1988 [JP] Japan .................... 63-216124
Aug. 31, 1988 [JP] Japan .................... 63-217904

[51] Int. Cl.$^5$ .................................. F02B 27/02
[52] U.S. Cl. .................................. 60/274; 60/313; 60/323
[58] Field of Search .................. 60/312, 313, 314, 323, 60/602, 274

[56] References Cited

U.S. PATENT DOCUMENTS

| | | | |
|---|---|---|---|
| 3,423,926 | 1/1969 | Nancarrow | 60/602 |
| 3,559,397 | 2/1971 | Navarro | 60/602 |
| 3,938,330 | 2/1976 | Nakajima | 60/323 |
| 4,008,572 | 2/1977 | Woollenweber | 60/602 |
| 4,165,763 | 8/1979 | Haugh | 60/602 |

FOREIGN PATENT DOCUMENTS 55-25602 8/1980 Japan .
60-128921 7/1985 Japan .
63-227924 9/1988 Japan .

Primary Examiner—Douglas Hart
Attorney, Agent, or Firm—Lyon & Lyon

[57] ABSTRACT

The present invention provides methods to take advantage of the exhaust gas pulses in an exhaust system of a multi-cylinder internal combustion engine to increase the volumetric efficiency over the complete operating range of the engine. It solves the problems of other systems which are only able to gain a beneficial effect from the exhaust gas pulses over a limited range of the engine operating speeds, by providing a means of varying the exhaust pipe lengths, combinations, and cross-sectional area of the exhaust passages of the multi-cylinder internal combustion engine. By this means it provides an exhaust system in which the exhaust gas pulse frequencies can be varied over the entire operating range of the engine to obtain desirable pulse frequencies matching the cylinder exhaust timing for efficient extraction of the exhaust gases, improvement in volumetric efficiency and a higher maximum engine speed. The various methods can be controlled by sensors connected to any or all of the engine rpm sensor, the gear change mechanism and the throttle valve. The methods are suitable for any type of multi-cylinder internal combustion engine, that is, in-line cylinders, horizontal opposed cylinders, V cylinder arrangement etc. and for any type of application whether stationary or on a moving vehicle. The methods solve the problem of other methods related to positioning on a motor cycle by being able to have the exhaust pipe combination change valve located between the engine cylinder exhaust outlet and later junctions of the exhaust pipes. Also the layout of the system is such that the components can be simply protected from damage and easily accessed for maintenance.

21 Claims, 30 Drawing Sheets

FIG. 28
(b)
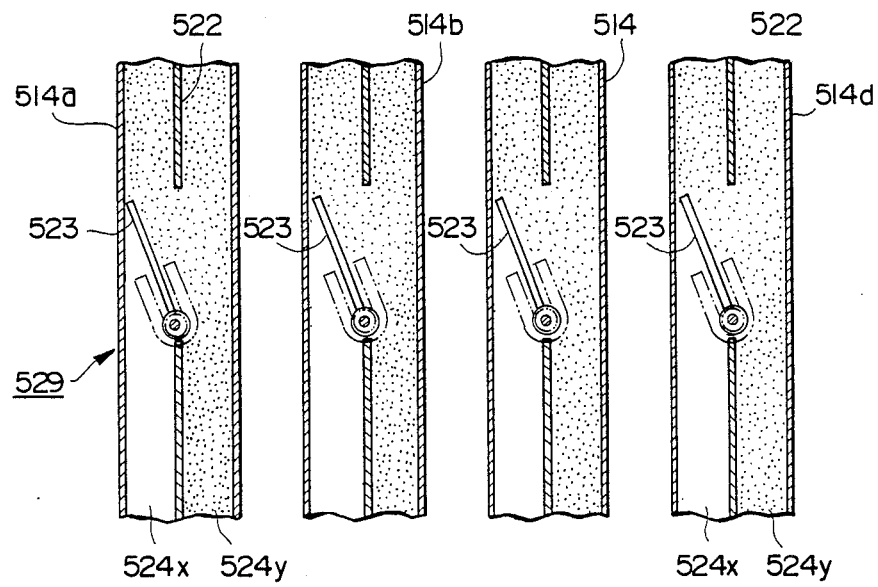
(c)
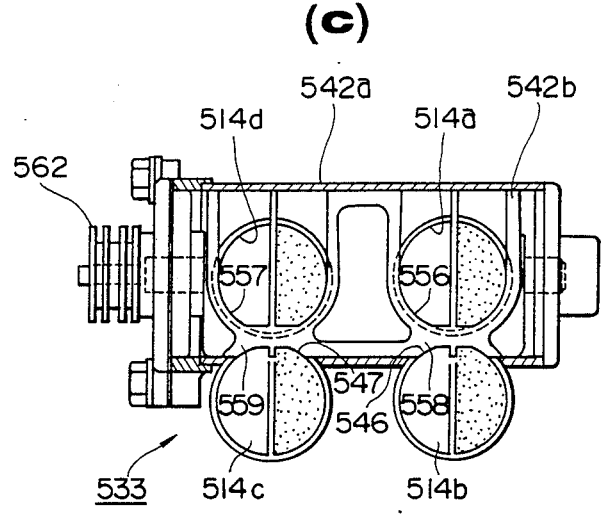

FIG. 29
(b)
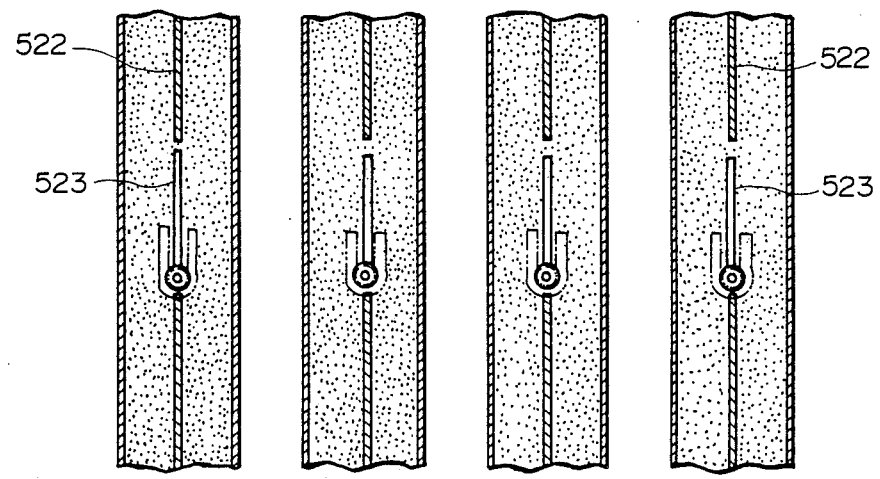
(c)
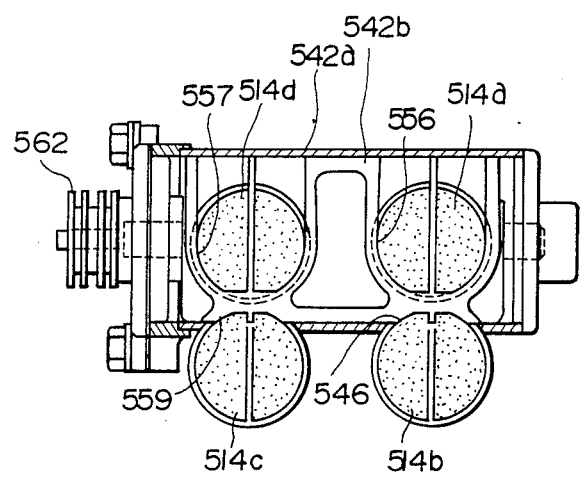

(a)

FIG. 30
(b)
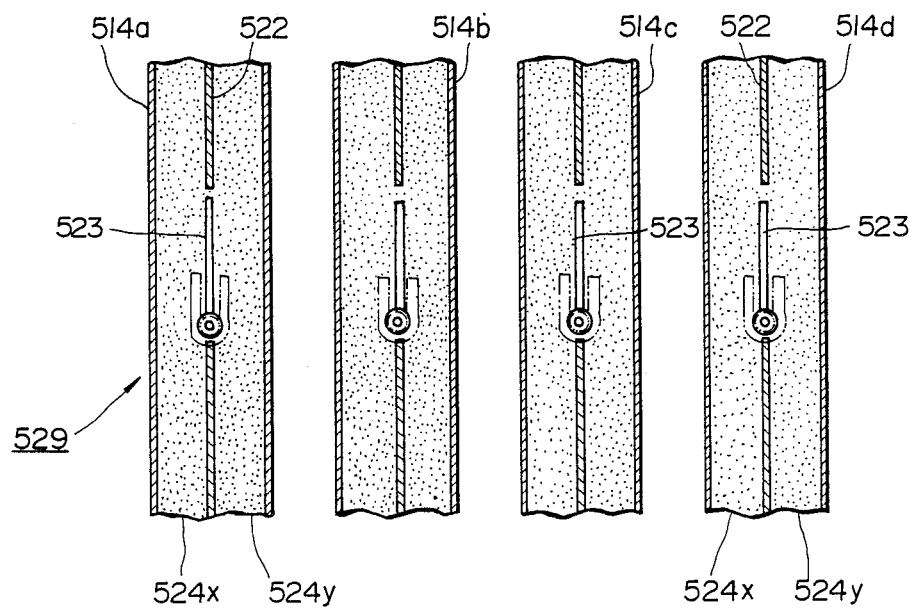
(c)
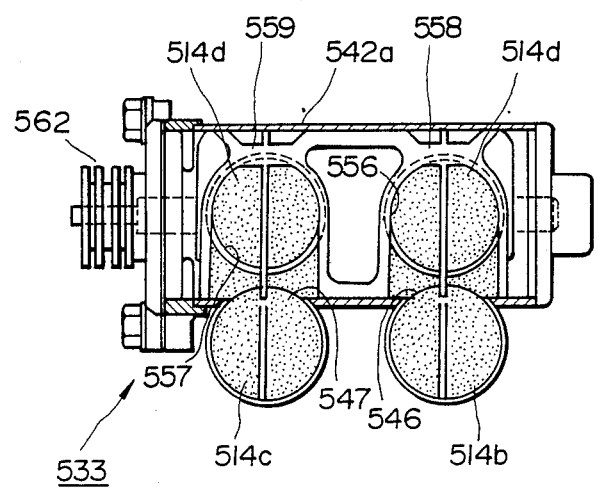

EXHAUST SYSTEM FOR MULTI-CYLINDER INTERNAL COMBUSTION ENGINES AND METHOD FOR CONTROLLING SAME

BACKGROUND OF THE INVENTION

The present invention concerns a method for modifying, combining and controlling the exhausts of a multi-cylinder internal combustion engine while operating to take advantage of the dynamic pulse effect of the exhaust flows to give an increase in volumetric efficiency, power and performance over a wide range of engine speeds.

Previous methods with multi-cylinder internal combustion engines take advantage of the exhaust gas pulses to improve the volumetric efficiency by having the resonance frequency of exhaust gas pulses at an optimum value for the extraction of the exhaust gases from the engine at the desired operating engine speed. Consequently at that engine speed, the resonance of exhaust gas pulses in the exhaust pipe will enhance the extraction of the exhaust gases from the engine and so improve the volumetric efficiency and power output. However, since the optimum resonance frequency varies for different engine speeds, the previous systems are only effective at a certain engine speed and at other speeds do not enhance the extraction efficiency and may even cause a back-pressure pulse that lowers the extraction efficiency below that which would be obtained if an exhaust pipe were not used.

For example, an exhaust system designed for high speeds does not provide desired dynamic effect at medium speeds. When the engine speed (Ne) drops to a medium speed, the volumetric efficiency of the engine is reduced because the dynamic effect does not match the exhaust timing. As a result, the output of the engines (Ps) will be reduced at medium speeds as shown by the continuous line in FIG. 1.

This problem has been solved to some extent with a new system described in the Japanese Utility Model Application Laid open with No. 55-25602 of 1980. This system features selector valves for combining exhaust flows according to the engine speed. That is by either integrating all the exhaust gas flows at the outlet or joining four pipes to two pipes and then two pipes to one pipe in the case of a four cylinder engine (4-2-1 exhaust passage combination), as a method to minimize the power output reduction due to the back-pressure pulse at the out of range engine speeds.

Another system has also been proposed in Japanese Patent Application Laid Open No. 60-128921 to protect against power reduction at the out of range engine speeds by varying the exhaust characteristics by changing the effective cross-sectional area of the exhaust pipes with the change in engine speed.

This applicant also filed Japanese Patent Application No. 62-61628 in 1987 to protect against the exhaust pressure of a 4 cycle, 4 cylinder internal combustion engine from being increased by the sudden change in passage area, by forming a so-called 4-2-1 exhaust passage combination resulting in an increase power characteristics, and by changing the combinations of the exhaust pipes to combine either pipes from cylinders at a 180° ignition phase difference or pipes from cylinders at a 360° ignition phase difference depending on the rotation speed of the engine.

Another system described in Japanese Patent Application Laid Open No. 62-12824 of 1987 features control valves located between exhaust pipes and the exhaust expansion chamber. These valves control the exhaust flows according to the engine speed to minimize power output reduction at out of range speeds. The system can be designed to offset undesirable back-pressure pulses at medium speeds as shown by the dotted line in FIG. 1.

However, all these methods are only effective in reducing the negative effect of the exhaust pulses at engine speeds outside the optimum speed for the system and are unable to improve the performance of the engine over a wide range of engine speeds by taking advantage of the exhaust pulse effect.

Also, the latter system is not applicable to motorcycle applications for the following reasons:

Normally, exhaust pipes are located under the frame and engine. If the above control valves are installed on these exhaust pipes, they will be exposed above the ground and may be damaged by rebounding rocks and other objects.

A standard expansion chamber is located on the rear side of the engine. The control valves are located between the expansion chamber and the exhaust pipes laid along the engine. When the motorbike is traveling, air may enter the exhaust pipes. Due to the relative positions described above, this air is heated by the engine and exhaust pipes before it reaches the valves. As a result, the valves cannot be cooled enough for normal operation. To solve these problems, additional improvement is required.

The method of modifying, combining and controlling the exhausts of multi-cylinder internal combustion engines of the present invention is designed to solve all of these problems.

SUMMARY OF THE INVENTION

The object of the present invention is to provide an exhaust system whereby an optimum value of the resonance frequency of the exhaust gas pulses can be obtained for improved exhaust extraction effect over a wide range of engine speeds. This can be achieved by the present invention by varying and controlling the effective area, length and combinations of the exhaust pipes of a multi-cylinder internal combustion engine over a wide speed range. Also considered is locating the various components on a motor cycle so that they will not adversely effect the operation of the motor cycle engine and will not be damaged under operating conditions of the motorcycle.

This object is achieved by different aspects of the present invention characterized by the following:

(1) a system to vary effective lengths of the multiple exhaust pipes from the multi-cylinder internal combustion engine to tune for different engine speeds;

(2) a system to vary the effective lengths and combinations of the exhaust pipes from each cylinder;

(3) a system to vary the effective lengths, combinations, and effective areas of the exhaust pipes from each cylinder;

(4) a control system to control the components of the various systems to give the optimum configuration for the particular operating conditions and engine speed; and (5) a method of locating the components on a motorcycle so as not to be susceptible to damage during operation and so as not to affect the performance of the motorcycle engine.

BRIEF DESCRIPTION OF THE DRAWINGS

FIG. 28(a)—(c) show the the exhaust system flow when the engine is in the low speed range.

DETAILED DESCRIPTION OF THE PREFERRED EMBODIMENTS

Preferred embodiments of the present invention will be described referring to the attached drawings from FIG. 1 to FIG. 30.

A first preferred embodiment uses the following method to overcome the problem of obtaining beneficial exhaust pulses from a multi-cylinder internal combustion engine over a wide range of engine speeds and of locating the system on a motorcycle engine. It will be described with reference to FIG. 2 to FIG. 7.

Figure 2:
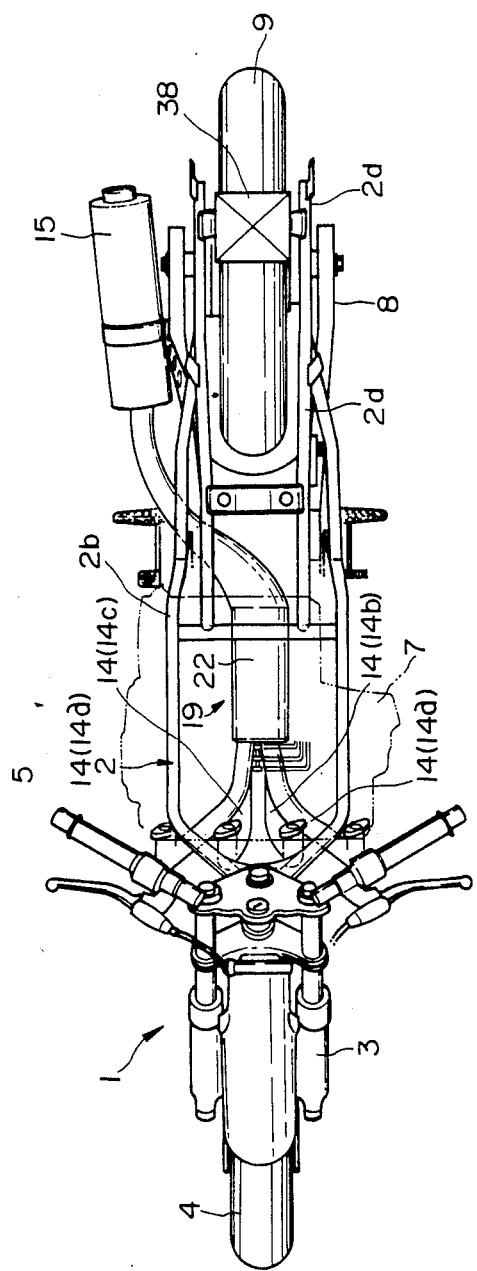
FIG. 2 shows plan view of a motor cycle fitted with an embodiment of the present invention.
Figure 3:
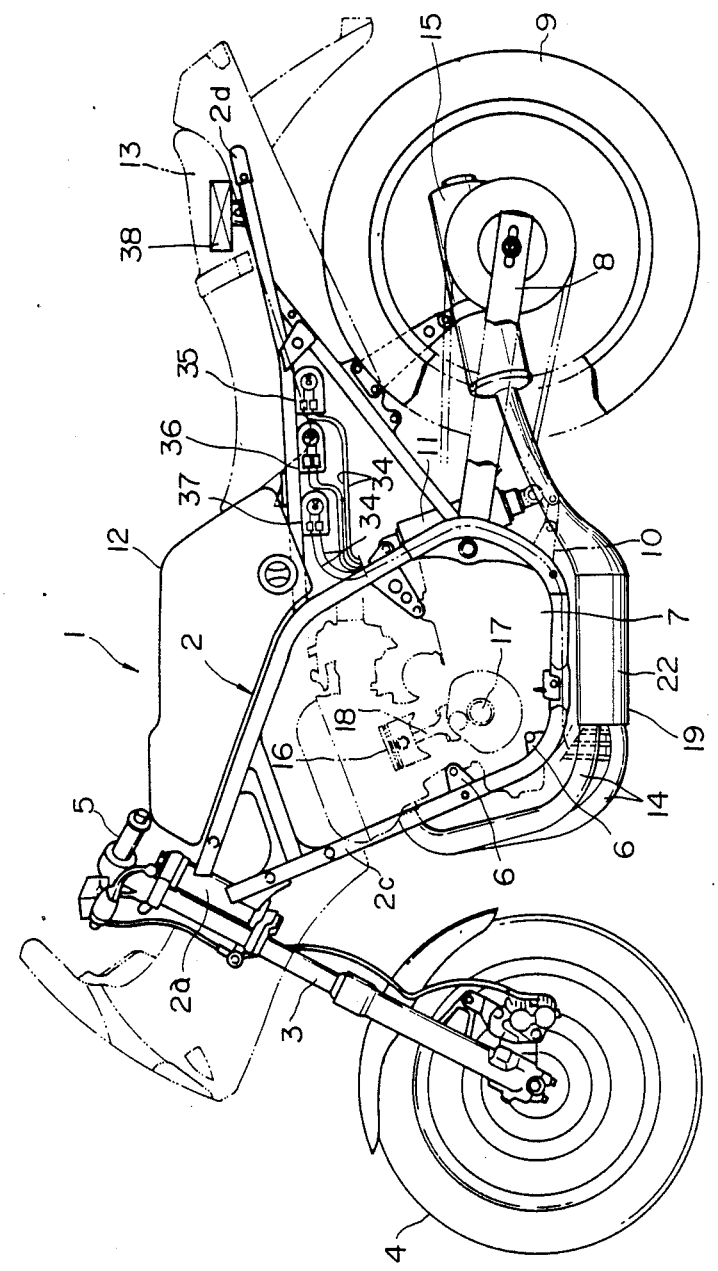
FIG. 3 shows a side view of the motorcycle of FIG. 2.

FIG. 2 and FIG. 3 show a motorbike 1 that uses the new variable exhaust system. It consists of the following components: frame 2; front fork 3 that pivots with the head pipe 2a at the front of the frame 2; front wheel 4 rotatably fixed to the front fork 3; steering handle 5 above the front fork 3; multi-cylinder internal combustion engine having four cylinders, hereinafter simply called "engine" 7, mounted near the center of the frame 2 and fixed with respect to both the main frame 2b and lower frame 2c through the brackets 6, rear fork 8 that pivots about the rear of the frame 2; rear wheel 9 rotatably supported by the rear fork 8; cushion unit 11 installed between the pivot center of the rear fork 8 and frame 2 through the link assembly 10; fuel tank 12 above the frame 2; driver's seat 13 on the seat rail 2d extending from the main frame 2b; multiple four exhaust pipes 14, or 14a to 14d; and silencer 15 at the end of the outlet where the exhaust pipes 14a to 14d are joined together.

Figure 4:
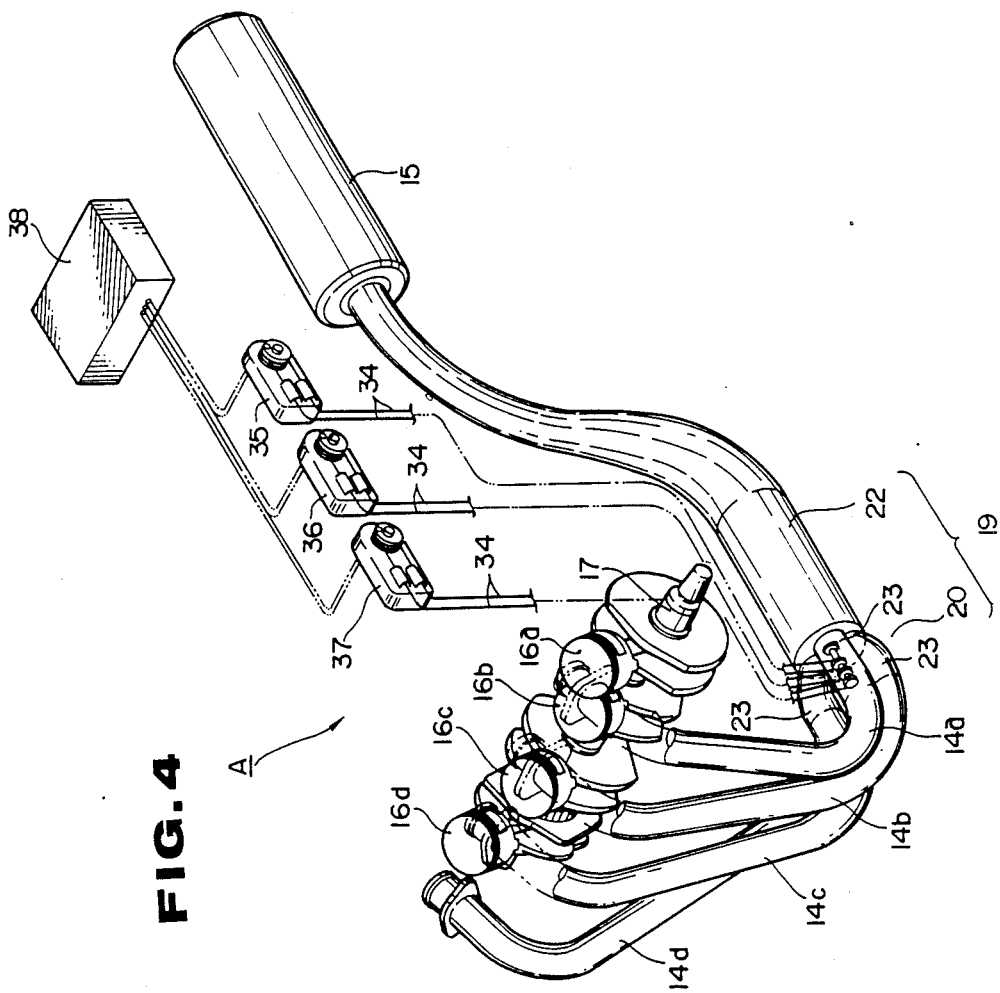
FIG. 4 is an oblique view of the exhaust system of the first preferred embodiment of the present invention.

FIG. 4 shows the pistons 16, or 16a to 16d, that are inserted into the cylinders, and a crank shaft 17 that connects to the pistons 16 through the connecting rods 18, or 18a to 18d.

The engine 7 has four cylinders. They are called the first to fourth cylinders from left to right from this side to the other side in FIG. 3 as viewed from the rear side of the frame. The cylinders are ignited in the following order at 180° equal intervals of rotation of the crankshaft 17: first cylinder—third cylinder—fourth cylinder—second cylinder.

As shown in FIGS. 3 and 4, the exhaust pipes 14a to 14d extend from the front side of the engine 7, and are directed downwardly to pass under the engine 7 where they are joined together at the exhaust collector 19. The exhaust pipes 14a and 14d that correspond to the first and fourth cylinders become closer to each other as they extend downwardly in front of the engine 7. They are closer to the engine 7 than the exhaust pipes 14b and 14c that correspond to the second and third cylinders. At the bottom of the engine 7, the exhaust pipes 14a and 14d are laid above the other exhaust pipes 14b and 14c.

More precisely, the exhaust pipe 14a, that corresponds to the first cylinder, hereinafter called the "first exhaust pipe", is located above the exhaust pipe 14b that corresponds to the second cylinder, hereinafter called the "second exhaust pipe". At the same time, the exhaust pipe 14d, that corresponds to the fourth cylinder, hereinafter called the "fourth exhaust pipe", is located above the exhaust pipe 14c, that corresponds to the third cylinder, hereinafter called the "third exhaust pipe". The exhaust collector 19 consists of the pipe connector 20 that connects to the exhaust pipes 14a, 14b, 14c, 14d, and valve assembly 22 containing rectangular valves 21a, 21b and 21c that control exhaust combinations (see FIG. 5).

Figure 5:
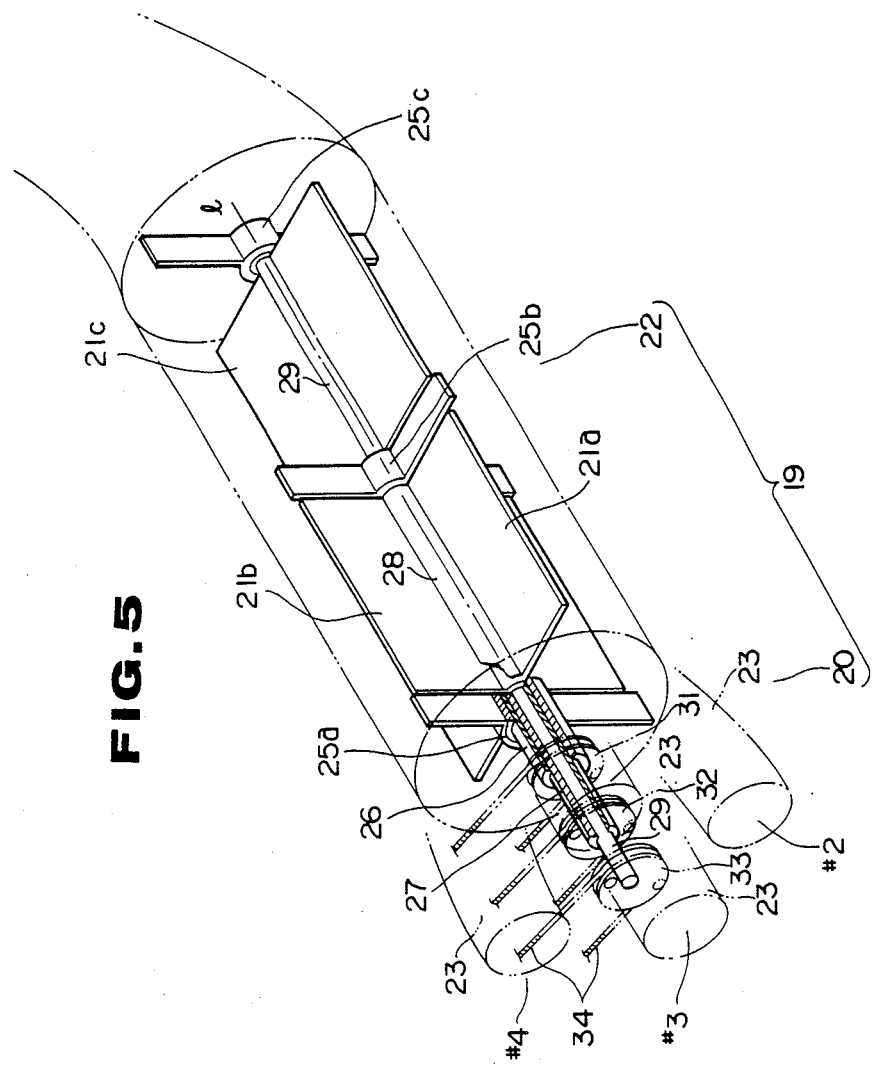
FIG. 5 shows details of one type of valve for the preferred embodiment of FIG. 4.

As shown in FIG. 5, the pipe connector 20 consists of the four pipes 23 aligned with the mating exhaust pipes 14a to 14d. They are connected with the corresponding exhaust pipes 14a to 14d at one end, and brought close together at the other end for communicating the pipes with respective quadrants of the connector 20. The pipe connector 20 is joined to the pipes 14a to 14d by brazing or welding, coupling bands, or other connecting means.

The valve assembly 22 comprises the bearings 25a, 25b and 25c provided at appropriate intervals along the axis of the cylindrical casing of the valve assembly 22. These bearings 25a, 25b and 25c support the corresponding valve stems to allow the valve plates 21a to 21c to rotate.

Figure 6:
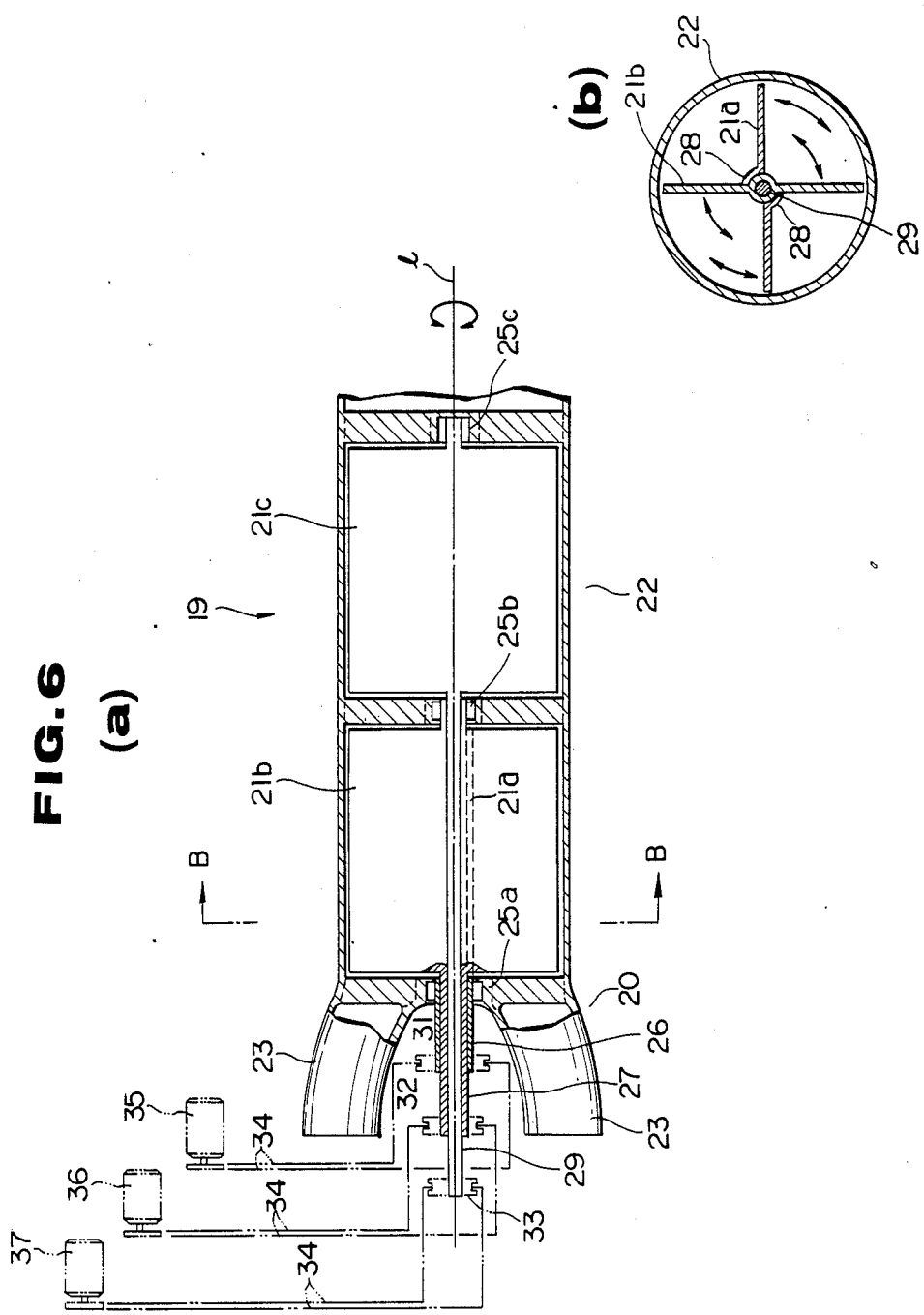
FIG. 6(a) is a longitudinal sectional of the valve arrangement of FIG. 4.
FIG. 6(b) is a cross section along the line B—B in FIG. 6(a).

FIGS. 5 and 6 show the details of the valve unit 22 in which the valve discs 21a and 21b are located on the front side. The valve disc 21a freely rotates around the axis L together with the valve stem 26 supported by the bearing 25a. The valve disc 21a is attached to the 90° arc-shaped element 28 along the rotation axis. The element 28 contracts the external surface of the valve stem 27 while it rotates with the valve plate 21a. The front part of the valve stem 27 is inserted into the valve stem 26 supported by the bearing 25a. Its rear end is supported by the bearing 25b to allow the valve plate 21b to rotate around the common axis L. The valve plates 21a and 21b can rotate individually in one direction to lie flat against each other. However, in the other direction, the minimum angle between the valve discs 21a and 21b about their axis is limited to 90° because of the 90° arc-shaped element 28. The valve plate 21c on the rear side rotates with the valve stem 29. The front part of the valve stem 29 is inserted into the valve stem 27, while its rear end is supported by the bearing 25c to allow the valve plate 21c to rotate around the common axis L.

The wire drums 31, 32 and 33 are provided at the ends of the valve stems 26, 27 and 29 that stick out from the casing. The wires 34 wound around the wire drums 31, 32 and 33 are connected to the servo motors 35, 36 and 37 to individually drive the corresponding valves.

For this application, double wires are used for the wires 34 to facilitate bi-directional rotation of the valve plates 21a to 21c. Stoppers, not included in the drawings, are provided for the bearings 25a to 25c to position the valve plates 21a, 21b and 21c at 0° from the horizontal axis to line up with the positions of the pipes 23 of the pipe connector 20. The servo motors 35, 36 and 37 are electrically controlled by the control unit 38. The rear part of the exhaust collector 19 extends upwardly to be linked with the silencer 15 located on the right side of the motorbike.

The variable exhaust system A of FIG. 4 consists of the exhaust pipes 14, exhaust collector 19, valve plates 21a to 21c in the exhaust collector 19, servo motors 35 to 37 and control unit 38. As indicated in FIGS. 2 and 3, the servo motors 35 to 37 are installed under the seal rail 2d covered by the seat 13. The control unit 38 is installed at the rear side of the seat rail 2d, and is also covered by the seat 13.

The rotation speeds of the engine 7 are converted to electrical signals for input to the control unit 38. When the engine speed has reached a set level, the control unit 38 generates signals to drive the servo motors 35, 36 and 37 to operate the valve plates 21a, 21b and 21c.

Based on the engine speed, the valve plates 21a, 21b and 21c are appropriately positioned to change the combinations of exhaust flows and collection point.

To maximize the engine output, the dimensions of the exhaust pipes 14 and valve plates 21a to 21c, and the position of the exhaust collector 19 must be carefully considered in relation to the rotation speed and ignition timing.

Figure 7:
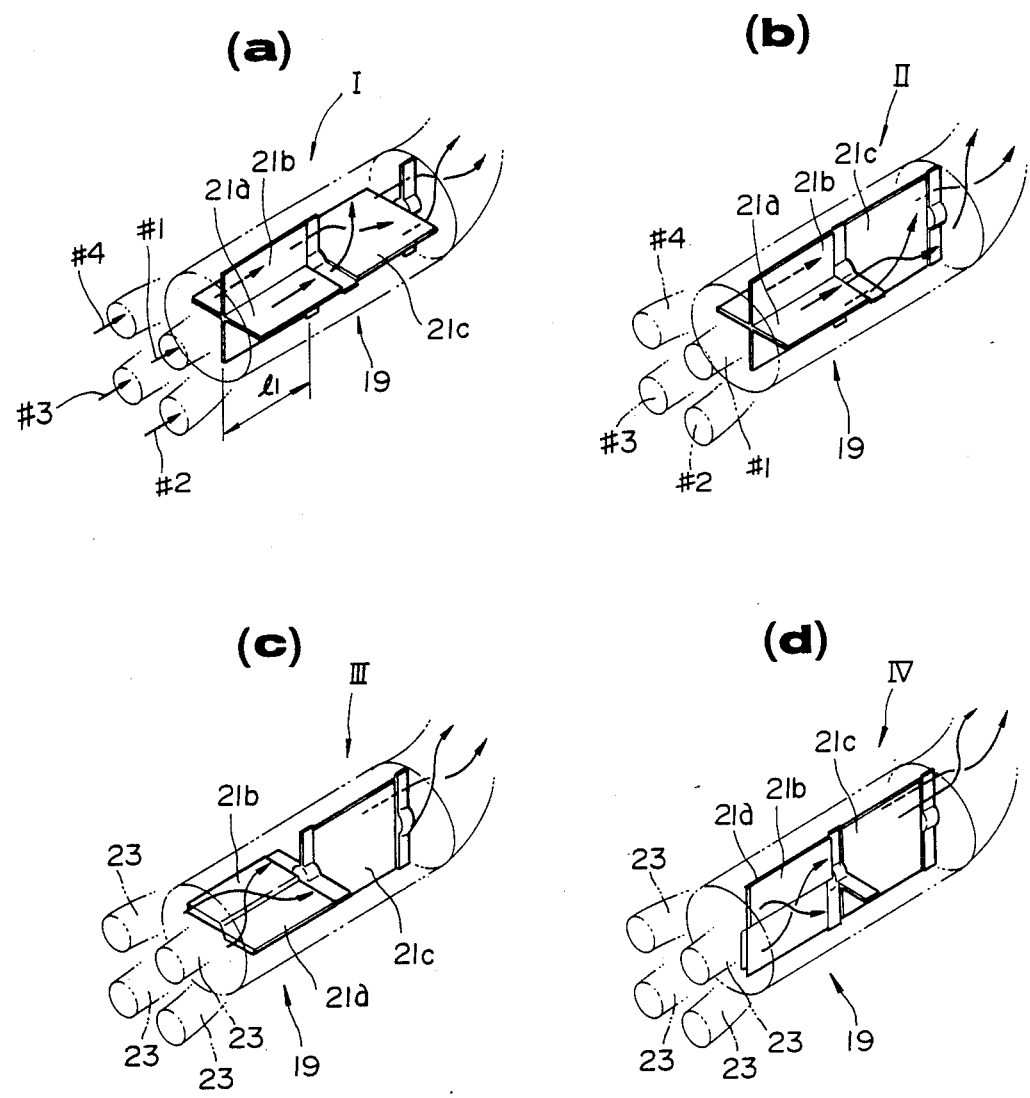
FIG. 7(a) to (d) describe the operational modes of the exhaust system of FIG. 4.
Figure 8:
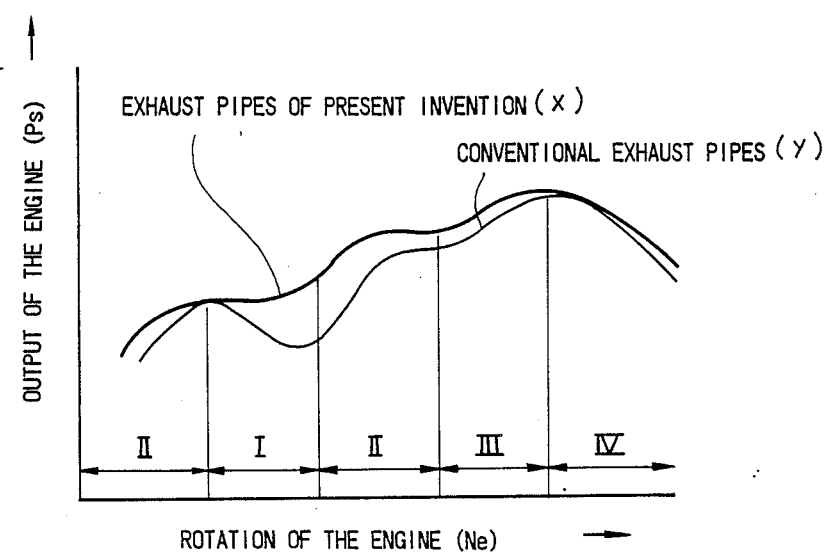
FIG. 8 shows the output power curve at the various operational modes of FIG. 7.

The variable exhaust system A enables four modes of exhaust control. These four modes are illustrated in FIG. 7 a,b,c,d. FIG. 8 shows operation in the four modes, I to IV, corresponding to those of FIG. 7. Selection of the mode appropriate to the speed range will optimize the dynamic effects of the exhaust pulses to maintain high engine output at all speeds.

In Mode I of FIG. 7(a), both the valve plates 21a and 21c are horizontal (0°), while the valve plate 21b is vertical (90°). The exhaust flows from the first and fourth pipes are separated by the valve plate 21b until they join at the end of the valve plate 21b. The same process applies to the exhaust flows from the second and third pipes. This means that the exhaust pipes are virtually elongated over the length of the valve plate 21b, in the figure. The joined flows from the first and fourth pipes are combined with the joined flows from the second and third pipes at the end of the valve plate 21c. This mode is defined as 360° collection because of the 360° ignition timing difference between the cylinders for the first and fourth exhaust pipes, and between the cylinders for the second and third exhaust pipes.

In Mode II of FIG. 7(b), the valve plate 21a is horizontal (0°), and both the valve plate 21b and 21c are vertical (90°). The exhaust flow from the first and second pipes are separated by the valve plate 21a until they join at the end of the valve plate 21a. The same process applies to the exhaust flows from the third and fourth pipes. As a result, the exhaust pipes are virtually elongated by the same length as in Mode I. This mode is defined as 180° collection because of the 180° ignition timing difference between the cylinders for the first and second exhaust pipes, and between the cylinders for the third and fourth exhaust pipes.

In Mode III of FIG. 7(c), both the valve plates 21a and 21c are horizontal (0°), and only the valve plate 21c is vertical (90°). The exhaust pipes become shorter than in Modes I or II by the length of the valve plate 21a. This mode is defined as 360° collection.

In Mode IV of FIG. 7(d), all the valve plates 21a, 21b and 21c are vertical (90°). The exhaust pipes become shorter than in Modes I or II by the length of the valve plate 21a. This mode is defined as 180° collection.

The above relations are summarized in the following table:

| Combination type | Mode for long pipes | Modes for short pipes |
| --- | --- | --- |
| 360° | I | III |
| 180° | II | IV |

FIG. 8 shows the output of an engine that uses the present new variable exhaust system. Appropriate modes are automatically selected based on the engine speed. For increasing engine speed the modes change from II→I→II→III→IV. Output signals from teh control unit 38 control the servo motors 35 to 37 to appropriately position the valve plates 21a to 21c. The variable control provides improved output over a wide speed range.

Any of the four modes FIG. 7(a) to (d) can be selected to dynamically control the exhaust for maximum output. As seen from FIG. 8, the variable exhaust system provides higher output X than the conventional exhaust system Y.

The above mode changes are indicated as a sample pattern. Different patterns may be used according to the design of exhaust pipes and valves, and the type of the engine used.

The valve plates 21a, 21b and 21c can be variously positioned at 90° intervals for flexible control.

The shape and size of each component used in the above application can be modified according to the design conditions.

The above description is based on a 4-cylinder, in line engine. However, the variable exhaust system can be applied to other types of multi-cylinder engines including 8-cylinder, V-type engines.

As described above, the new variable exhaust system changes the combinations of exhaust flows and length of exhaust pipes based on the engine speed. As a result, improved output is obtained over an extended speed range.

The system can be applied to 4-cylinder engines ignited at 180° intervals to provide the "4—2—1" stepped exhaust collection based on the four modes, short or long pipes, combined with 360° or 180° phase difference pipes.

The second preferred embodiment is similar to the first preferred but is simpler and provides for two of the four modes obtained in the first embodiment, i.e., 360° out-of phase long combination of Mode I (FIG. 7(a)) and the 180° out-of phase short combination of Mode IV (FIG. 7(d)). It uses two arrangements of valve plates to achieve these combinations.

With these arrangements either a 4-pipe duct or 2-pipe duct is possible as with the forward sections of FIG. 7(a) and FIG. 7(d); however in this case one of the valve plates 21b is fixed and combinations are changed by movement of baffle plate 21a through 90 degrees. With the first arrangement of this second preferred embodiment, the section rear of the movable valve plate consists of a fixed bulkhead to give a 4-duct arrangement and this is followed by a short rear section giving a 2-duct passage followed by the final outlet into the single exhaust pipe, whereas with the second arrangement the 4- or 2-passage section is extended longer and there is no following 4-passage section before the fixed 2-passage.

Figure 9:
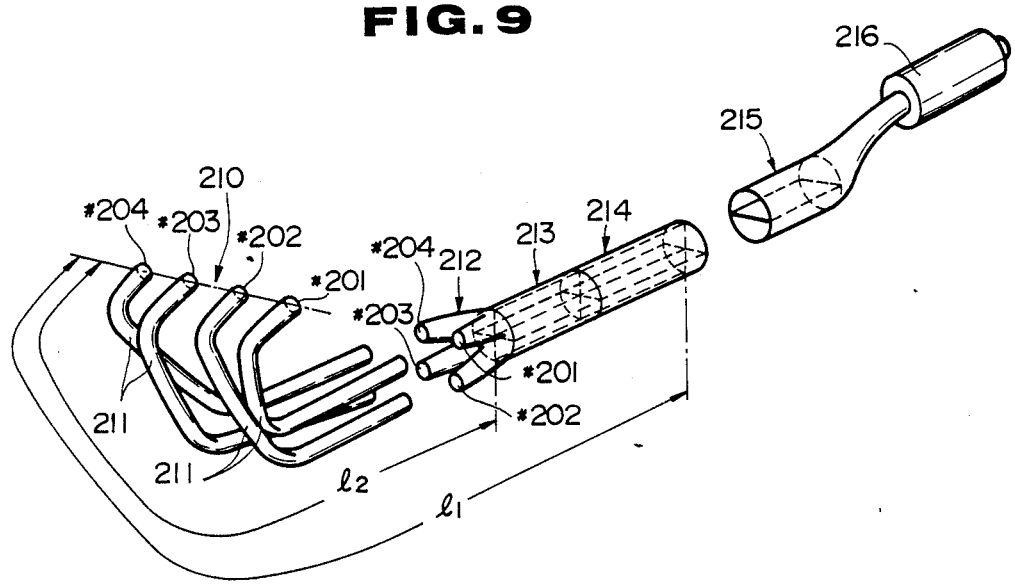
FIG. 9 shows the outline drawing of the second preferred embodiment.
Figure 11:
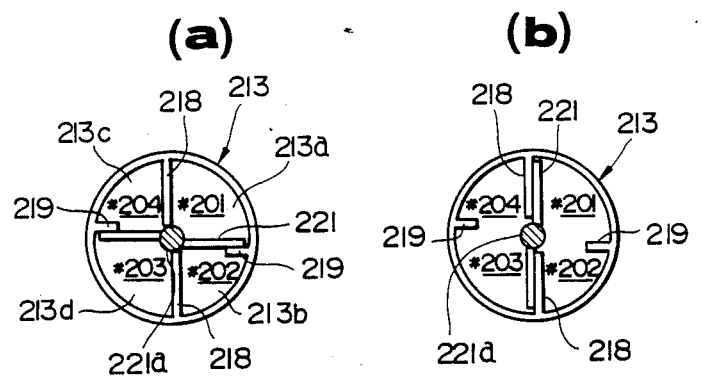
FIG. 11(a) and (b) show end elevations of the fixed ducts.

Details of the arrangements will be given with reference to FIG. 9 to FIG. 14. FIG. 9 shows the outline of the exhauster of the second preferred embodiment. The group of exhaust pipes 210 comprises exhaust pipes 211 numbered 201 through 204, and are connected with the exhaust ports of a similar engine to the first preferred embodiment with firing order 201, 202, 204 and 203. The four exhaust pipes are brought together at the connecting pipe 212 and joined to a variable duct 213 with fixed partition 218 and movable valve plate 221 dividing the interior into two or four ducts, and a duct 214 partitioned into sections; a,b,c,d dividing it into four fixed ducts followed by a split duct 215 having two divided sections at the upstream portion, followed by a silencer 216.

Figure 10:
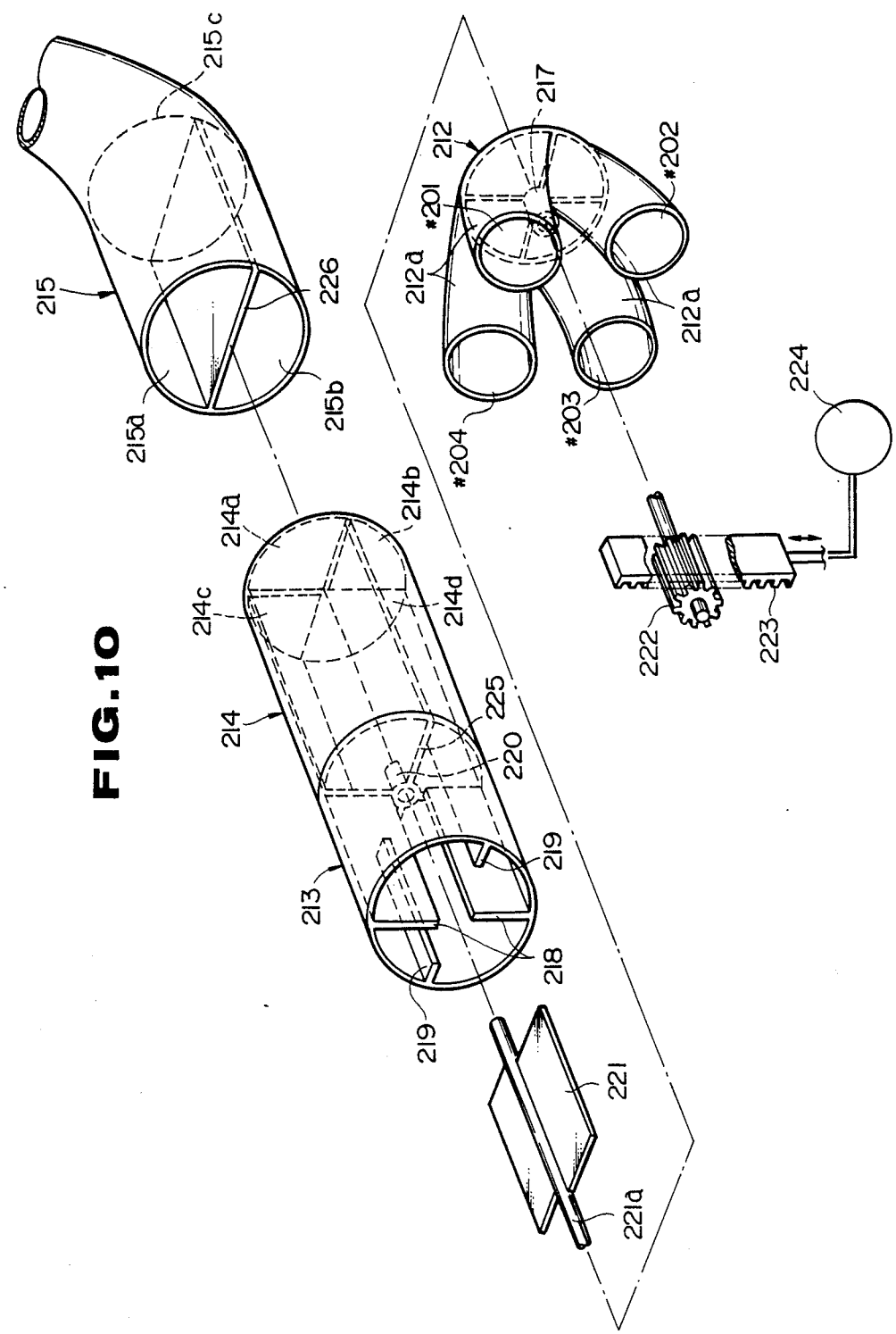
FIG. 10 shows an exploded perspective view of the valve of FIG. 9.

In FIG. 10, connecting pipe 212 is a welded duct system which combines the four ducts together so that they flow into four separated quadrants outlets. The center part contains a bearing support 217 to take the center shaft 221a of the movable valve plate 221.

Variable duct 213 is equipped with bulkhead 218 vertically dividing the passage into two partitions and sidestopper 219, and bearing 220 at the center downstream.

Butterfly-type valve plates 221 are inserted into the central gap of bulkhead 218, the shaft 221a being supported-type said bearings 217 and 220, and pinion 222 being fixed to shaft 221a outside bearing 217 and rotated by the servo-motor 224 inter-connected with the rack 223 and controlled by the rotation speed of the engine.

Variable duct 213, as shown in FIG. 11(a), (b), has its passage divided into four sections 213a, 213b, 213c and 213d by the valve plates 221 and bulkhead 218, when the valve plates 221 comes in contact with the stopper 219, and divided into two sections when the valve plates 221 overlap the bulkhead 218. And to one side of the bulkhead 218, the exhaust pipes 201 and 202 are connected, and to the other side exhaust pipes 204 and 203 are connected. Furthermore when the valve plates 221 rotate through an angle of 90°, each exhaust pipe 211 connects with four separated passages.

Figure 12:
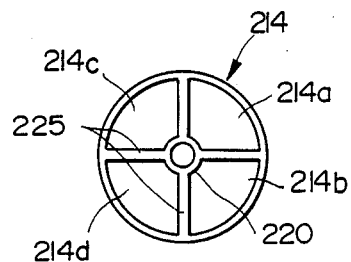
FIG. 12 shows the end elevation of the fixed duct.

The fixed duct 214 is equipped with a cross-shaped partition 225 which is in line with the bulkhead 218, and valve plate 221 whereby the variable duct 213 is divided into four sections, and the passages are divided, as shown in FIG. 12, into four sections 214a, 214b, 214c and 214d, and bulkhead 226 positioned perpendicular to the bulkhead 218 inside the junction duct 215. The bulkhead 226 divides the passage the junction duct 215 into two sections, 215a, 215b, with one passage, 215c disposed downstream therefrom.

As per the above configuration, when the valve plates 221 divide the variable duct 213 into four sections as shown in FIG. 11(a), the length $l_1$ (FIG. 9) from the entrance of the exhaust pipe 211 to the exit of the fixed duct 214 will be the length of independent long exhaust pipes to obtain exhaust pulses suitable for low/middle speed operation. After coming out of the fixed duct 214, exhaust gases pass through either of the two passengers, 215a or 215b, of the junction duct 215 in flowing to the passage 215c. Therefore the junction duct 215 is used as both a 4—2 junction and 2—1 junction.

And when the valve plates 221 are rotated to lie against the bulkhead 218 as shown FIG. 11(b), the variable duct 213 will be divided into two sections, where the exhaust gas enters, so the exhaust from cylinders 1 and 2 will flow together through both passages, 213a and 213b, then through the fixed duct, 214 (passages 214a and 214b) to both the passages, 215a and 215b, of the junction duct 215. Therefore, the total independent length of the exhaust pipes will be that of the exhaust pipes 211 and the connecting pipe 212, that is the length $l_2$ for high speed operation. Accordingly, the ducts 213 and 214 will be 4—2 combination and the junction duct 215 will form 2—1 combination providing 4—2—1 combination for either case of high or low speed driving.

Thus, by changing the variable duct, in either case of low/middle or high speed, a suitable exhaust pulse effect can be obtained, providing an effect as shown in FIG. 12.

Figure 13:
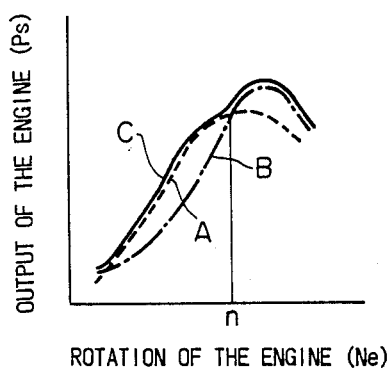
FIG. 13 is a characteristic curve showing the effect of the change in duct length.

In FIG. 13, curve A is the power characteristic for the low/middle speed operation when the length of the exhaust pipe is $l_1$, and curve B the power characteristic for the high speed operation when the length of the exhaust pipe is $l_2$. The power, characteristic of the high power as shown in curve C, can be obtained by changing the valve plates when engine speed Ne is "n".

Figure 14:
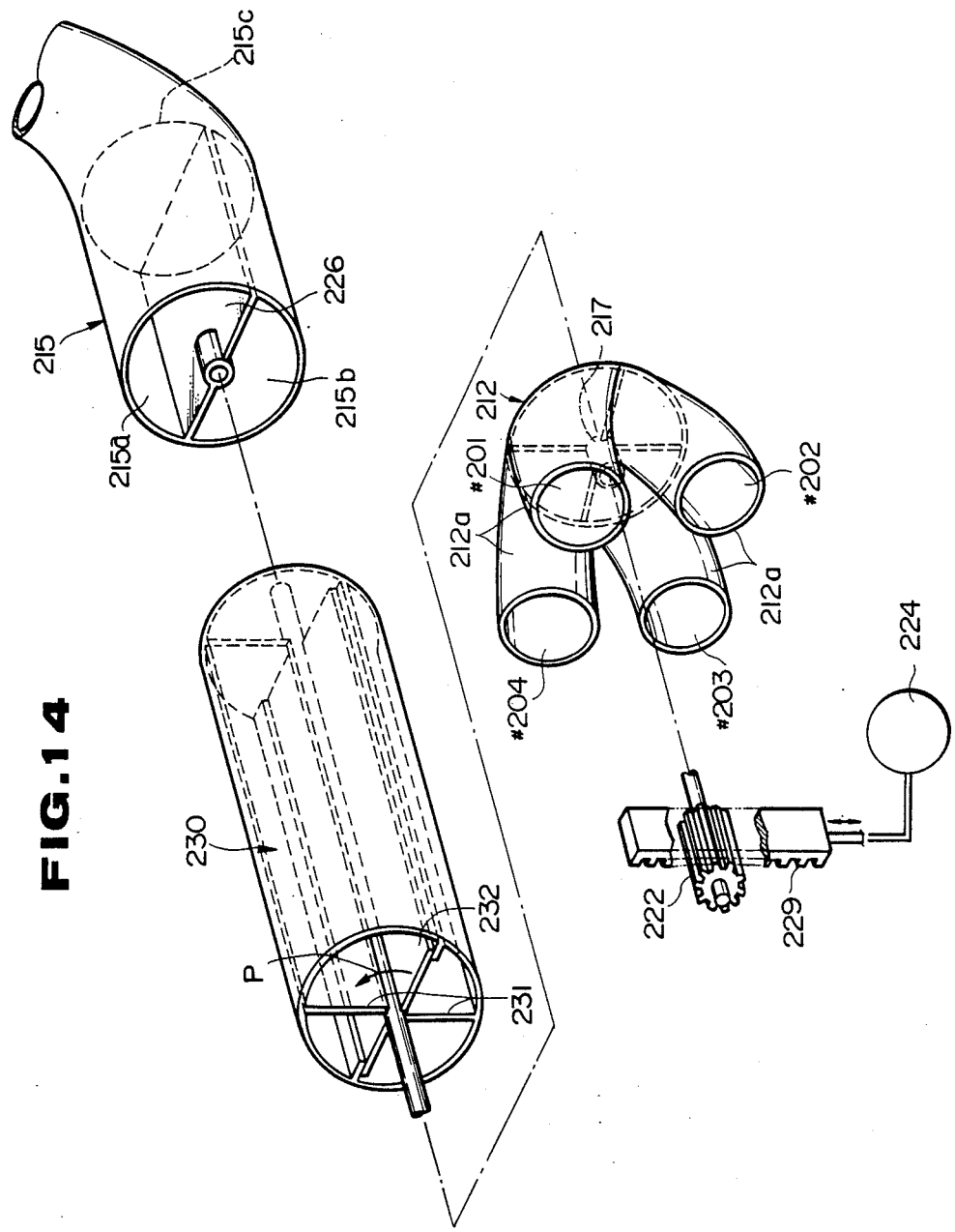
FIG. 14 is an exploded perspective view of another example a the valve.

In this second embodiment, the passage is divided into two or four sections by the variable duct 213 and the fixed duct 214, however these ducts 213 and 214 can be replaced with a variable duct 230, as shown in FIG. 14. This duct 230 is installed between the connecting pipe 212 and junction duct 215, while the bulkhead 231 and the valve plates 232 extend over the whole length of the junction duct 215. The valve plates 232 can be rotated from the four-division state as shown in FIG. 14, in the arrow direction to an angle of 90°, giving the two-division state. By using this configuration, the same effect as the example of FIG. 11 can be achieved.

When combining such pipes 201/202, and 204/203 as the exhaust pipe combination having an ignition phase difference of 180° as for each example shown in FIG. 11(b), better high speed characteristics can be obtained without exhaust interference at the high speed operation in the experiment similar to mode IV of FIG. 7, while such combination as 201/204, and 202/203, having an ignition difference of 360°, can provide an exhaust system with better low speed characteristics being the same as the example of FIG. 7, mode III. As shown in the above, the maximum power can be obtained depending on the rotation speed of the engine, as well as the resistance to the exhaust flow being minimized by taking 4—2—1 combinations and making the length of the exhaust pipe variable. The function of only rotating one set of valve plates as an adjustment means at an angle of 90°, is simple as compared with the first method, since the axial length of the variable duct means No. 1 can be minimized, the valve plates can be designed simple and light weight.

A third preferred embodiment improves, in addition to the improvements mentioned above, its cooling characteristics and protection of the lower duct from damage by using a selector valve to change the combinations of exhaust pipes, and has the pipe connectors distant from the engine to give 4—2 and 2—1 combinations. The selector valve is located under the frame of the motorcycle and is installed at the same level as the upper exhaust pipes being protected by the lower pipes which pass under it to prevent direct exposure. The valve is positioned between the connections of the exhaust pipes and the engine to minimize heated air and facilitate cooling.

The following paragraphs describe a typical application of the third embodiment, with particular reference to FIGS. 15 to 22.

Figure 15:
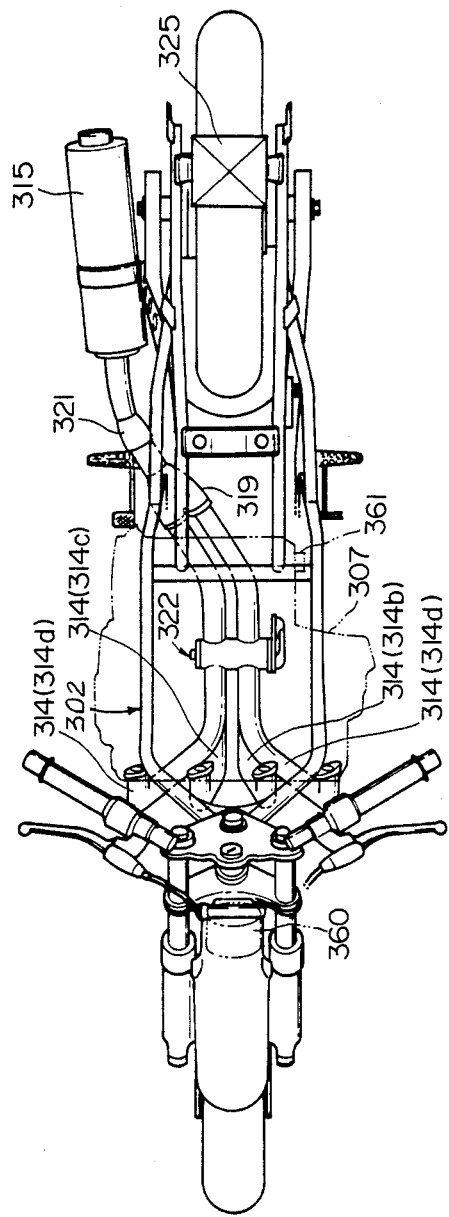
FIG. 15 shows plan view of a motor cycle fitted with a third embodiment of the present invention.
Figure 16:
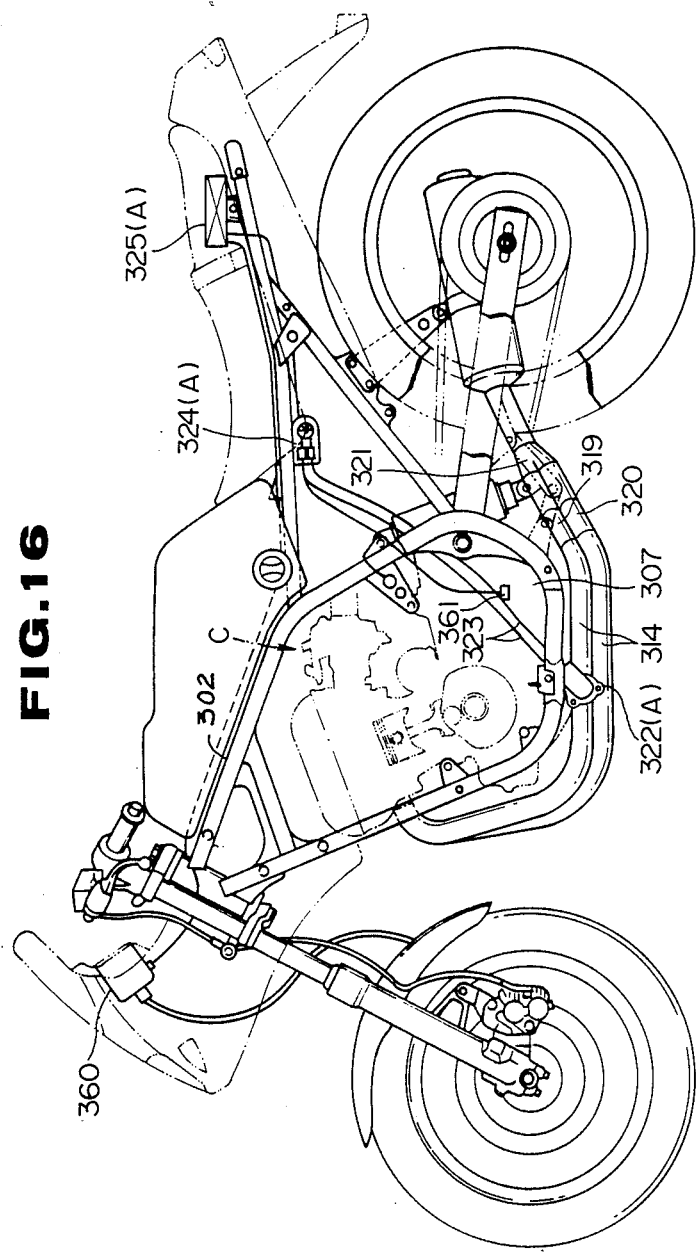
FIG. 16 shows a side view of the motorcycle of FIG. 15.

As shown in FIG. 15 and FIG. 16, the exhaust pipes 314a to 314d extend from the front side of the engine 307. They are directed downwardly to pass under the frame 302 and engine 307 to the underside of the frame 302.

The exhaust pipes, 314a and 314d, that correspond to the first and fourth cylinders, are combined by the pipe connector 319. The exhaust pipes 314b and 314c, that correspond to the second and third cylinders, are combined by the pipe connector 320. These pipe connectors 319 and 320 are joined by the pipe connector 321 and connected to the silencer 315.

Figure 17:
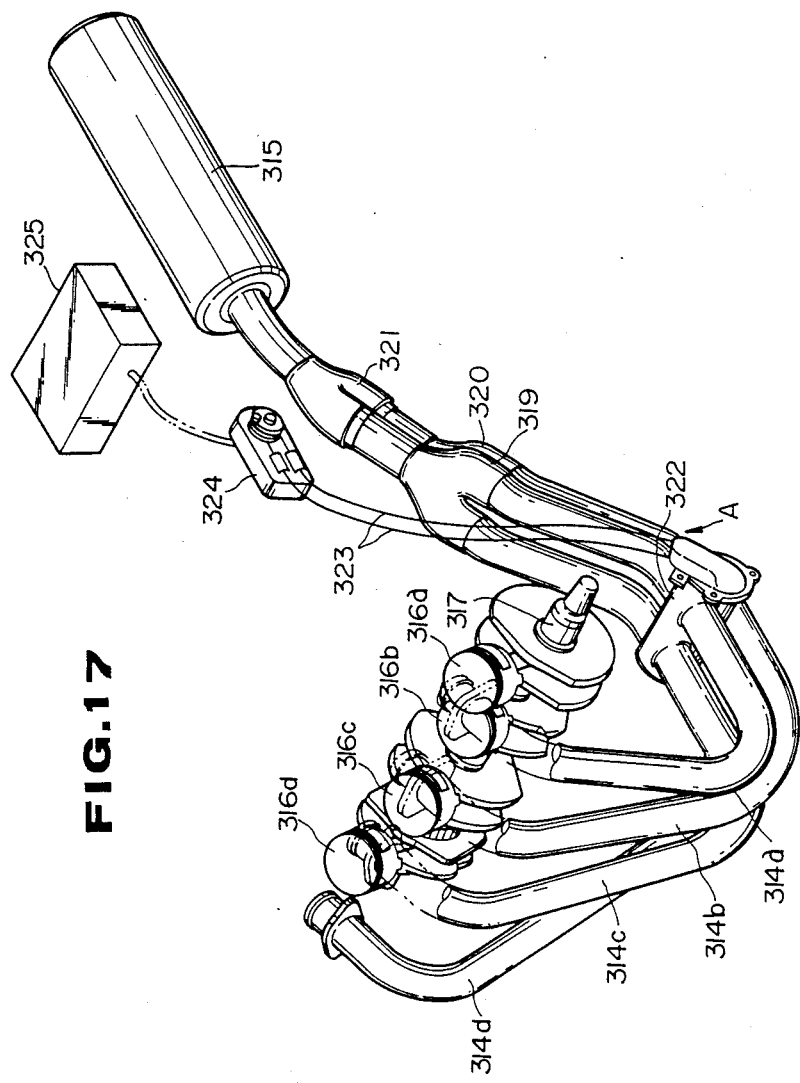
FIG. 17 is an oblique view of the exhaust control system of FIG. 15.
Figure 18:
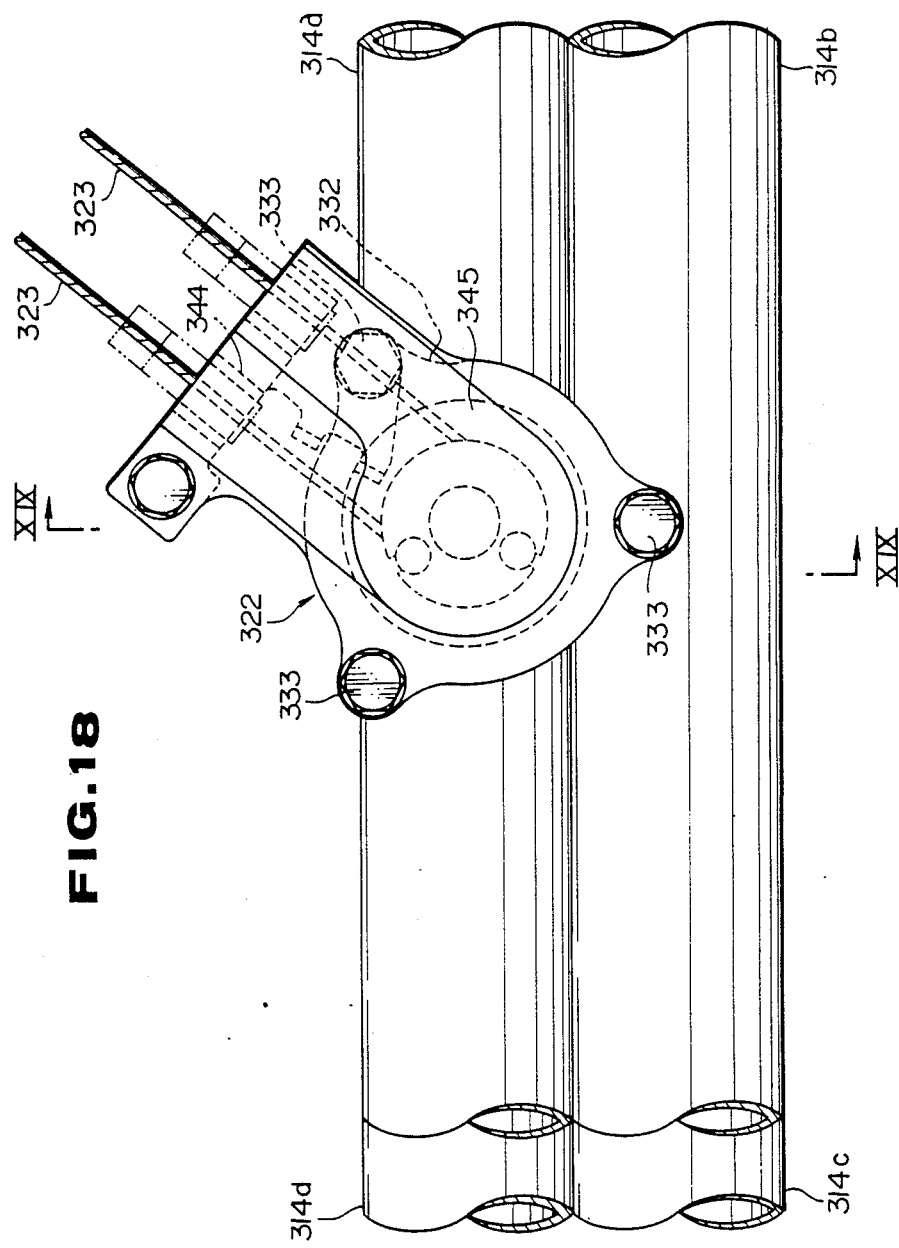
FIG. 18 is a side view of the selector valve.

Under the frame 302 and engine 307, the exhaust pipes, 314a and 314d, that correspond to the first and fourth cylinders, are laid above the other exhaust pipes, 314b and 314c, that correspond to the second and third cylinders. The selector valve 322 is provided between the exhaust pipes 314 and pipe connectors 319 and 320 to change the combinations of exhaust flows. As shown in FIGS. 16 and 17, the selector valve 322 is connected to the actuator 324 through the wire 323. The actuator 324 is electrically controlled by the control unit 325. The exhaust control system A consists of the exhaust pipes 314, selector valve 322, actuator 324 and control unit 325.

The exhaust pipes, 314a to 314d, are connected to the cylinders as with the 1st and second embodiments, however their other ends connect to the selector valve 322.

Figure 19:
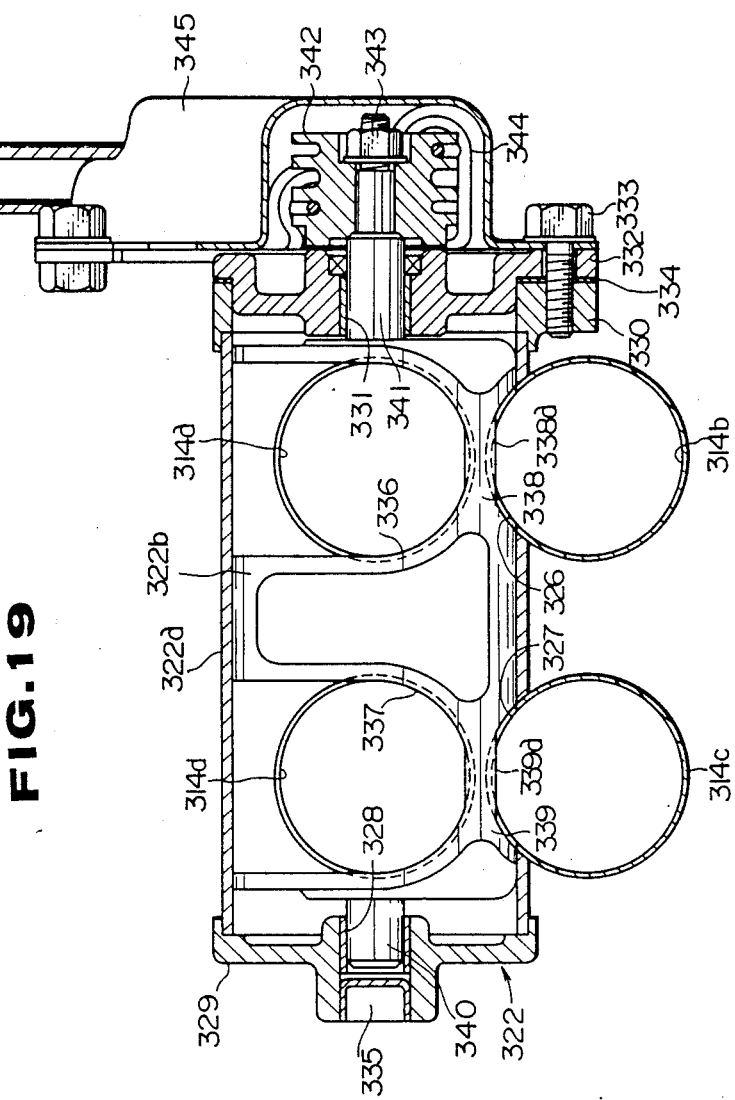
FIG. 19 is a cross sectional along the VI—VI line in FIG. 18.

As shown in FIGS. 16 and 17, the selector valve 322 is located under the frame 302 and engine 307, and positioned between the engine 307 and the pipe connectors 19, 20. As seen from FIGS. 18 and 19, the selector valve 322 consists of the cylindrical casing 322a and valve drum 322b that rotates inside the casing 322a about its axis. The first and fourth exhaust pipes, 314a and 314d, pass through the casing 322a at right angles and are securely brazed or welded to casing 22a. As shown in FIG. 19, these pipes can be combined with the second and third exhaust pipes, 314b and 314c, respective, through the orifices 326 and 327.

One end of the casing 322a is closed by the cover 329 supporting the bearing 328. The other side is closed by the detachable cover 332 supporting the bearing 331. The cover 332 is fixed with the set ring 330 by the bolt 333. The gasket 334 is tightly inserted between the set ring 330 and cover 332 to fill the clearance.

Further, the bearing 328 supported by the cover 329 on the side of the casing 322a is covered by the cap 335 to assure air tightness.

As shown in FIG. 19, the valve drum 322b tightly contacts both internal surfaces of the casing 322a. It consists of the following parts: Two U-shaped parts 336 and 337 horizontally aligned in the casing 322a with the upper exhaust pipes 314a, 314d, and the remaining parts 338 and 339 that open or close the orifices 326 and 327 mentioned earlier. The concave parts 338a and 339a cover the internal surfaces of the second and third exhaust pipes 314b and 314c when the orifices 326 and 327 are closed by the parts 338 and 339.

The shafts 340 and 341 are inserted into the bearings 328 and 331 on both sides of the valve disc 322b. These shafts 340 and 341 support the valve drum 322b so that it can rotate inside the casing 322a.

The shaft 341, inserted into the bearing 331 passes through the cover 332 and protrudes out from the casing 322. At this end, the wires 323 are wound around a detachable wire drum 342 that is fixed by a nut 343 to the protruding end of the shaft 341.

With this embodiment, a dual wire 323 is used to facilitate bi-directional rotation of the valve drum 322b. The two parts of the wire 323 are separated from each other by the guide plate 344 on the cover 332, and protected by the cover 345. Bothe the guide plate 344 and cover 345 are fixed to the set ring 330 by the bolt 333 that also fixes the cover 332.

The actuator 324 is installed under the seat rail 302d covered by the seat 313. The control unit 325 is located on the seat rail 302d near the rear side, and is also covered by the seat 313.

The rotation speeds of the engine 307 are converted to electrical signals for input to the control unit 325. When the engine speed has reached a predetermined level, the control unit 325 generates signals to drive the actuator 324 to operate the selector valve 322.

The selector valve 322 is installed at the same level as the upper exhaust pipes 314a and 314d. It is protected by the lower exhaust pipes 314b and 314c from direct exposure and damage by rebounding rocks and other objects.

Further, the selector valve 322 is located under the frame and engine 307 to be doubly protected from foreign objects.

At the same time, the selector valve 322 is positioned towards the front of the engine 307 to minimize contact with heated air and to facilitate cooling.

At low and medium engine speeds, the valve 322b is rotated by the actuator 324 to close the orifices 326 and 327 of the casing 322a by the parts 338 and 339. As shown in FIG. 17, none of the exhaust valves, 314a to 314d, are combined. The first and fourth exhaust pipes 314a and 314d are combined by the pipe connector 319 near the outlet. Similarly, the second and third pipes 314b and 314c are combined by the pipe connector 320.

The above combination virtually elongates the exhaust pipes. The combinations of the exhaust pipes 314 are determined by the ignition timing of the corresponding cylinders. At low to medium speeds, they are combined to match 360° ignition phase difference: i.e. the first and fourth cylinders 14a and 14d, and the second and third cylinders 314b and 314c. As a result, a dynamic exhaust pulse is produced at the optimum timing to improve volumetric efficiency.

Figure 20:
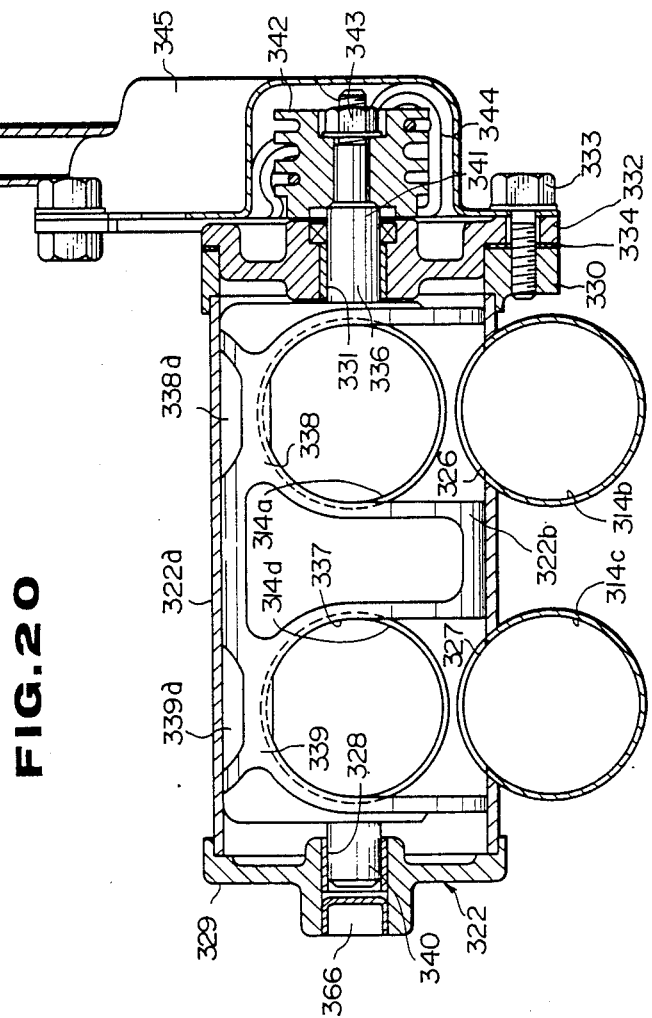
FIG. 20 is identical to FIG. 19 except the valve drum is in a different position.

At high engine speeds, the valve 322b is rotated 180°, as shown in FIG. 20, by the actuator 324, as controlled by signals from the control unit 325.

The U-shaped parts 336 and 337 of the valve drum 322b are inverted to respectively combine the first and second exhaust valves 314a and 314b, and the third and fourth exhaust valves 314c and 314d. The exhaust pipes are virtually shortened. The above combination matches exhaust pipes of 180° ignition phase difference. As a result, the dynamic pulse effect is optimized to improve volumetric efficiency.

Figure 1:
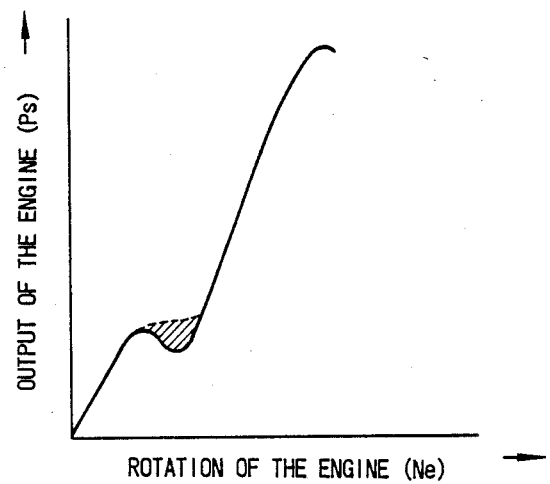
FIG. 1 shows the power output curve of a conventional exhaust system.
Figure 21:
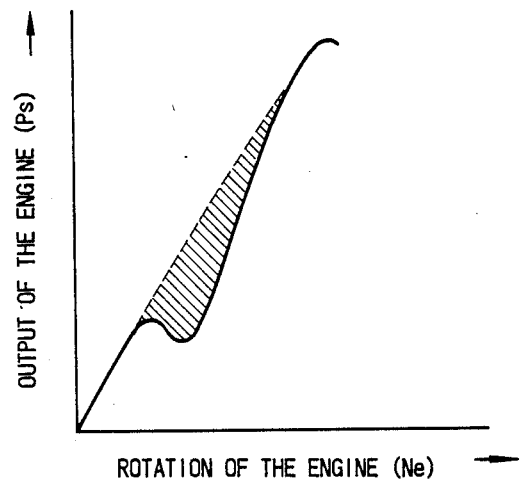
FIG. 21 compares the output curves for the conventional and new exhaust system.

FIG. 21 compares the power output curves of engines that use the exhaust control system A and a conventional exhaust system. The continuous line is the conventional output curves, while the dotted line indicates the improved output.

As is clear form these graphs, the exhaust control system according to the present embodiment also improves engine output over a wide speed range.

The bearing 328 is protected by the cap 335 inserted into the cover 329 of the valve disc 322. The cap 335 is detachable to facilitate the maintenance of the bearing 328. The other cover 332 is attached to the set ring 330 by bolts 333. This cover 332 can also be detached for checking the bearing 331. Also, the valve drum 322b can be easily removed for maintenance. The shape and size of each component used for the above application can be modified according to design conditions.

Figure 22:
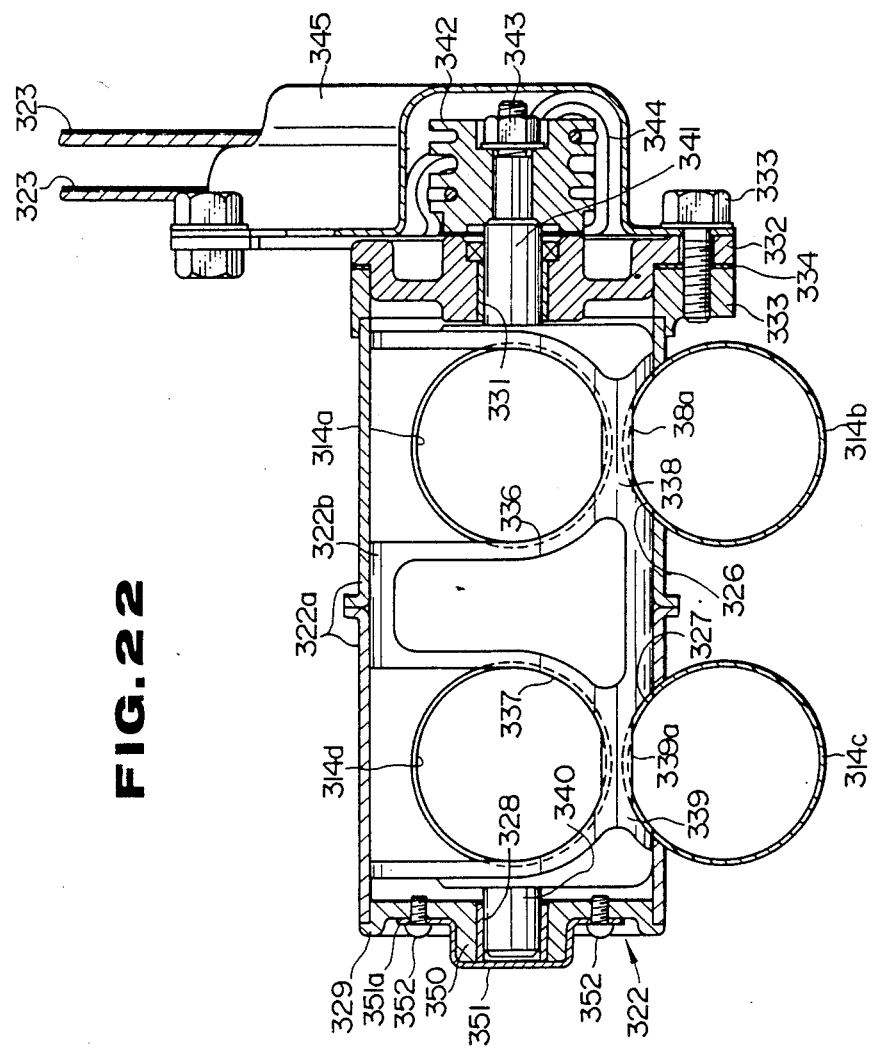
FIG. 22 shows another construction of the selector valve of FIG. 19.

For example, the casing 322a may be composed of two parts as shown in FIG. 22. So the separate parts can be brazed before the exhaust system is assembled. This separate structure facilitates repositioning of the exhaust pipes 314.

FIG. 22 also shows an alternative design to protect the bearing 328. It replaces the cap 335 inserted into the cover 329. In FIG. 22, the bearing 328 is enclosed in the boss 350 covered by the cap 351. The cap 351 is fixed to the cover 329 by the washer 351a and screw 352. The cap 351 can be easily removed by loosening the screw 352. The above construction facilitates the maintenance of the bearing 328.

With this preferred embodiment the following advantages are achieved, the upper and lower exhaust pipes are appropriately combined for the stepwise collection of exhaust;
the exhaust pipes are optimally combined at appropriate points according to the selector valve positions;
the pipes are elongated at low to medium speeds, and shortened at high speeds to utilize the dynamic pulse effect of exhaust for improved volumetric efficiency and output;
locating the selector valve above the lower exhaust pipes prevents possible damage and failure; and
the valve is positioned under the frame and engine for double protection, and is positioned upstream of the exhaust pipe junction between the junction and the engine to minimize heated air and facilitate cooling.

A typical operation program will be described with reference to FIG. 23. Here operating states are divided into three zones of I through III for every 5,000 rpm, and in every boundary area the changeover operation of the said diverter valve 322 is carried out to provide variable exhaust control. Hereafter we will make a detailed description about control in each zone.

[Zone I]

In the case where the rpm of the internal combustion engine 307 is lower than the first set value 5,000, the valve drum 322b is rotated by the actuator 324, and by blocking up the through-holes 326 and 327 of the casing 322a with the blocked up portions 338 and 339 thereof, as shown in FIG. 19, respective exhaust pipes 314 314a to 314d are put in an independent state so that the No. 1 exhaust pipe 314a and No. 4 exhaust pipe 314d, which are located on the upper section of the valve, are in a state where the length from the internal combustion engine 307 to the junction pipe 319 is continuous; and the lower No. 2 exhaust pipe 314b and No. 3 exhaust pipe 314c, likewise, are in a continuous state from the internal combustion engine 307 to the junction pipe 320.

This state provides a long exhaust passage before combining the flows of exhausts from cylinders with a 360° ignition phase difference i.e. cylinders No. 1 and No. 4 cylinder, and No. 2 and No. 3 respectively. This gives a beneficial dynamic pulse effect to exhaust gases flowing through respective exhaust pipes 314, to result in improvement of volumetric efficiency in the low rpm zone.

[Zone II]

When the rpm of the engine 307 exceeds the first set value, a drive signal is issued based upon its information from the control unit 325 to the actuator 324, then the valve body 322b of the diverter valve gets rotated by 180° of angle, as shown in FIG. 20.

In this state, No. 1 exhaust pipe 314a is connected to No. 2 exhaust pipe 314b, and No. 4 exhaust pipe 314d is connected to No. 3 exhaust pipe 314c, respectively, by the opened areas 336 and 337 of the valve drum 322b. Consequently, the distance to the junction point of the respective exhaust pipes 314 is reduced to form a short exhaust passage, and at the same time, the exhaust pipes 314 corresponding to cylinders a 180° ignition phase difference can be joined. As a result, the dynamic pulse effect of the exhaust gas can effectively be obtained to improve the volumetric efficiency in the intermediate rpm zone.

[Zone III]

Furthermore, when the rpm Ne of the internal combustion engine 307 rises and reaches the second set value 10,000 rpm, the actuator 324 gets driven by means of a drive signal output from the control unit 325, and the said valve drum 322b is rotated 180° in the direction opposite to the previous direction so that the combination state of the exhaust pipes 314 becomes the same as for the state of zone I.

In this state, long separate exhaust passages are obtained and the exhaust pipes 314 corresponding to cylinders with a 360° ignition phase difference, i.e. between No. 1 cylinder and No. 4 cylinder and between No. 2 cylinder and No. 3 cylinder can be joined, so that a beneficial dynamic pulse effect of exhaust gases in respective exhaust pipes 314 in the high rpm zone can be obtained, thereby improving the volumetric efficiency in the high rpm zone.

Table 1. summarizes the above operations.

TABLE 1

| Zone | I | II | III |
|---|---|---|---|
| RPM. Ne | Below 5,000 | 5,000–10,000 | 10,000–15,000 |
| Exhaust pipes length | Long | Short | Long |
| Combinations | No. 1 + No. 4<br>No. 2 + No. 3 | No. 1 + No. 2<br>No. 3 + No. 4 | No. 1 + No. 4<br>No. 2 + No. 3 |
| Ignition phase difference | 360° | 180° | 360° |

Figure 23:
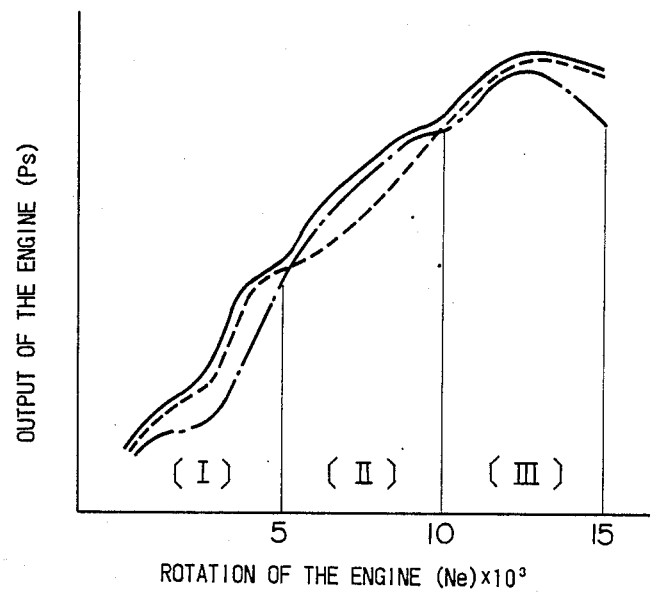
FIG. 23 shows curves of the power output from an engine fitted with the system of the third embodiment.

FIG. 23 shows the output characteristics of the internal combustion engine 307 using variable exhaust controls. In this figure, the output characteristic shown with a dashed line is for the case where the diverter valve 322 is adjusted for zone I over the whole speed range, and the output characteristic shown with a broken line is for the case where the diverter valve 322 is adjusted for zone II over the whole speed range while, the output characteristic shown with a full line is for the case where changeover operation is carried out at each zone boundary of Table 1.

As is clear from these results, the power at the upper maximum rpm is increased and good output characteristics without any output drop have been obtained over the whole speed range.

The aforementioned control pattern is only one possible application example, and besides this, it is possible to employ the control patterns, as shown in the following tables, Table 2, Table 3, Table 4, by having different operating zone boundaries and different combinations within the zones.

TABLE 2

| Zone | I | II | III |
|---|---|---|---|
| RPM. Ne | Below 5,000 | 5,000–10,000 | 10,000–15,000 |
| Exhaust pipes length | Long | Short | Long |
| Combinations | No. 1 + No. 2<br>No. 3 + No. 4 | No. 1 + No. 4<br>No. 2 + No. 3 | No. 1 + No. 2<br>No. 3 + No. 4 |
| Ignition phase difference | 180° | 360° | 180° |

TABLE 3

| Zone | I | II | III | IV |
|---|---|---|---|---|
| RPM. Ne | Below 4000 | 4000–8000 | 8000–12000 | 12000–15000 |
| Exhaust pipes length | Long | Short | Long | Short |
| Combinations | No. 1 +<br>No. 4<br>No. 2 +<br>No. 3 | No. 1 +<br>No. 2<br>No. 3 +<br>No. 4 | No. 1 +<br>No. 4<br>No. 2 +<br>No. 3 | No. 1 +<br>No. 2<br>No. 3 +<br>No. 4 |
| Ignition phase difference | 360° | 180° | 360° | 180° |

TABLE 4

| Zone | I | II | III | IV |
|---|---|---|---|---|
| RPM. Ne | Below 4000 | 4000–8000 | 8000–12000 | 12000–15000 |
| Exhaust pipes length | Long | Short | Long | Short |
| Combinations | No. 1 +<br>No. 2<br>No. 3 +<br>No. 4 | No. 1 +<br>No. 4<br>No. 2 +<br>No. 3 | No. 1 +<br>No. 2<br>No. 3 +<br>No. 4 | No. 1 +<br>No. 4<br>No. 2 +<br>No. 3 |
| Ignition phase difference | 180° | 360° | 180° | 360° |

Though, in each case of the said control patterns, the exhaust pipes 314 combinations correspond to cylinders with a 360° ignition phase difference and long lengths of the exhaust pipes as well as in which the exhaust pipes 314 combinations correspond to cylinders with a 180° ignition phase difference and short lengths of exhaust pipes, however, it is also possible to employ the control patterns opposite to these by arranging the exhaust pipe combinations and selector valve to give the characteristics as shown in Table 5.

TABLE 5

| Zone | I | II | III |
|---|---|---|---|
| RPM. Ne | Below 5,000 | 5,000–10,000 | 10,000–15,000 |
| Exhaust pipes length | Short | Long | Short |
| Combinations | No. 1 + No. 4<br>No. 2 + No. 3 | No. 1 + No. 2<br>No. 3 + No. 4 | No. 1 + No. 4<br>No. 2 + No. 3 |
| Ignition phase difference | 360° | 180° | 360° |

Though, in the said examples of applications, only the rpm of the internal combustion engine 307 was used as a control factor, it is possible, besides the above, to employ a vehicle speed signal from the vehicle speed sensor 360 and/or speed changing signal from the shift position sensor 361 shown in FIG. 16. By using these signals, control conforming to real traveling conditions of the vehicle can be carried out, and as a result, improvement of acceleration performance and fuel consumption can be achieved. In addition, in the case where only two zones are needed in the operating patterns, the control can be set to neglect the other zones and no specific modification is required. Further, various shapes, dimensions, and so forth, shown in the said exhaust variable apparatus A are only examples and it is possible to have any variety of shapes and dimensions that conform with design requirements, etc.

Further, in the said example of application, we described an internal combustion engine with four in-line cylinders, however the application is not necessarily limited thereto, and it is naturally possible to apply the example to other kinds of multi-cylinder type internal combustion engines.

This third preferred embodiment provides an alternative method to change the combination of joined exhaust pipes and their length to their junction point by using a diverter valve which changes the combined state of these exhaust pipes, and provides different zone configurations to suit different operating conditions of the multi-cylinder internal combustion engine. By operating the said diverter valve in the boundary area of each of these zones, the system gives the following advantages as described below.

Combination of exhausts from cylinders having different explosion cycles can be changed so the dynamic pulse effect of exhaust gas being exhausted from respective cylinders can be controlled, moreover, the lengths to the junctions of the exhaust pipes can also be varied, and thereby the effective utilization of the dynamic pulse effect of exhaust gas is possible over a wide speed range resulting in a higher maximum rpm of the engine. Therefore, the dynamic effect of exhaust gas can be utilized over a wide rpm range to significantly improve the output characteristics of the engine or, in other words, the volumetric efficiency and maximum rpm of internal combustion engine.

A fourth preferred embodiment of the present invention is characterized by the fact that it is equipped with a device for changing the effective cross-sectional area of the exhaust pipes as well as with an exhaust pipe combination change diverter valve and pipe junction arrangement similar to the method of the third preferred embodiment.

With this fourth preferred embodiment, even if the rotational frequency of the internal combustion engine is in the low/middle or high speed rotation range, it can give the most suitable combination of exhaust pipes to obtain the dynamic effects by selecting the most suitable combination of exhaust pipes and lengths as with the third preferred embodiment and can also provide variations of cross-sectional area for each of the combinations of the third embodiment to provide greater control of conditions to gain maximum benefit from the effect of variation of multiple exhaust combinations.

Figure 24:
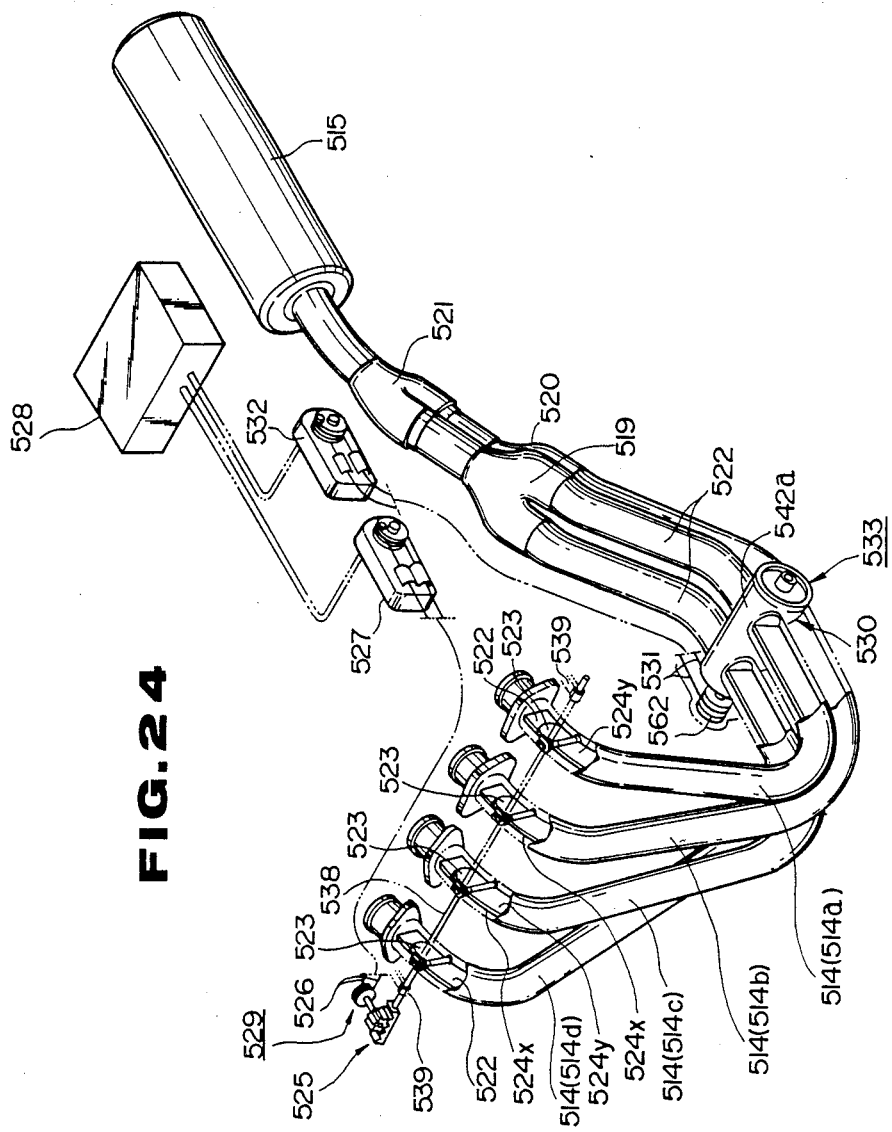
FIG. 24 is a perspective view of the exhaust system of the fourth preferred embodiment.

This fourth preferred embodiment will be explained with reference to FIG. 24 to FIG. 30. As shown in FIG. 24, the exhaust pipes 514a to 514d extend from the front side of the engine 307 in a similar way to the arrangement of the third preferred embodiment shown in FIG. 15 and FIG. 16, and are directed downward to pass under the frame 302 and engine 307 to the under side of the frame 302.

The exhaust pipes 514a and 514d that correspond to the first and fourth cylinders are combined by the pipe connector 519. The exhaust pipes 514 b and 514c that corresponds to the second and third cylinders are combined by the pipe connector 520. These pipe connectors 519 and 520 are joined by the pipe connector 521 connected to the silencer 515. The selector valve 530 is provided between the exhaust pipes 514 and pipe connectors 519 and 520 to change the combinations of exhaust flows. This selector valve 530 is connected to the actuator 532 through the wire 531. The actuator 532 is electrically controlled by the control unit 528.

The exhaust pipes 514, 514a to 514d, are arranged as in the third preferred embodiment FIG. 17 extending from the engine outlet to the junction pipes 519 and 520 and are divided into right and left passages by a partition wall 522 positioned vertically in the center of the pipes.

Figure 28A:
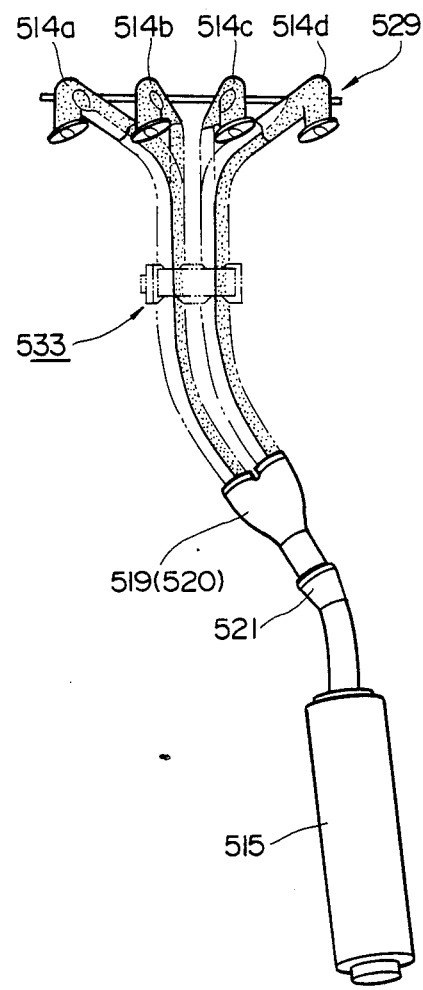

Near the connection of each exhaust pipe to the engine, plate valve 523 is installed on a cut out part of the partition wall 522. By rotating the plate valve 423 to a certain angle as shown in FIG. 28b and FIG. 29b, the right and left passages 524x and 524y can be opened or closed so that both exhaust flow passages or only one passage can be used. The plate valve 523 is connected with actuator 527 through transmission 525 and wire 526; that is, the said partition wall 522, plate valve 523, transmission 425, actuator 527, and control unit 528 connected with the actuator 527 to comprise the variable exhaust pipe cross-sectional area method 529 which varies the actual cross section area of exhaust pipes 514.

The exhaust pipes 514a and 514d corresponding to the cylinders No. 1 and No. 4, are located in the lower part of the body and internal combustion engine 307 and up above the exhaust pipes 514b and 514c corresponding to the cylinders No. 2 and No. 3, and the change valve 530 is mounted at a location above the center line of the lower exhaust pipes 514 to change the combination of the exhaust pipes. The change valve 530, as shown in FIG. 24, is connected through wire 531 with actuator 532, which is electrically connected with the said control unit 528. And the change valve 530, actuator 532 and control unit 528 comprise a exhaust pipe and combination change system to change the combination of exhaust pipes for different effective lengths.

Figure 25:
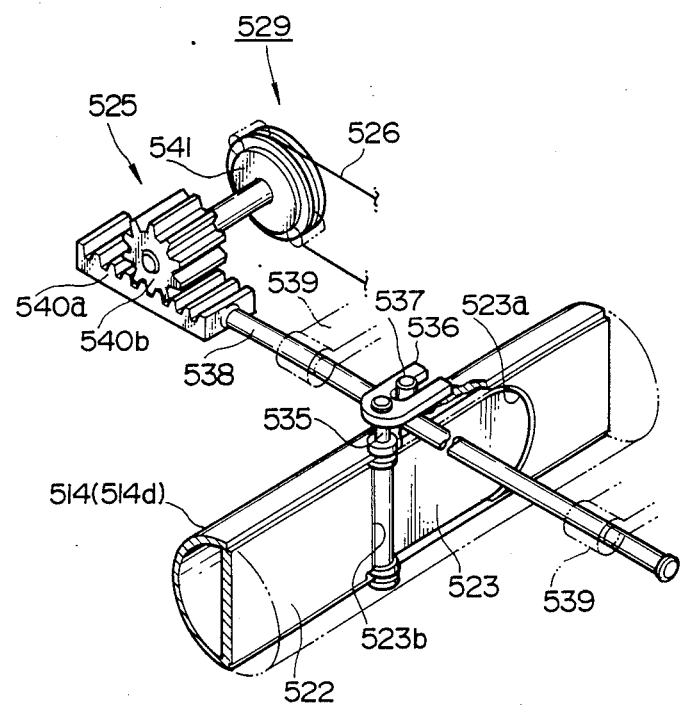
FIG. 25 is a perspective view explaining the operation of the plate valve system of FIG. 24.

FIG. 25 shows details of the plate valve 523. This has a circular arc end and is mounted in the exhaust pipe 514 so that the circular arc 523a of the valve is located at the upstream side, and the vertical part 523b of the valve located at the downstream side.

The vertical part 523b is inserted and fixed to the shaft 535 to rotate as an integral whole togehter with the plate valve 523. The shaft 535, projects out of the top and is rotatably supported by the wall part of the exhaust pipe 514. The fork 536 is fixed on the projecting top part of the shaft 535. The above configuration is common to the other plate valves installed between the exhaust pipes 514a-514d.

Pins 537 are held between forks 536 and fixed together by the one bar 538, which is supported for free sliding in the axial direction by the supporting part 539 extended from the body of the motorcycle. Rack 540a is fixed on one end of the bar 538, meshed with pinion 540b attached to the wire drum 541 around which the wire 526 is wound. That is the transmission 525 is composed of fork 536, pin 537, bar 538, rack 540a and pinion 540b and can change the plate valve 523 alternatively to either the state shown in FIG. 28(b) or that shown: FIG. 29(b) when the actuator 527 is operated, depending on the rotation speed of the internal combustion engine 307 based on the signal from control unit 528.

Further, a stopper (not shown) is mounted on the bar supporting part 539 to set a limit to the movement of the bar 538, and rack 540a and pinion 540b may be covered by a case, not illustrated here.

Figure 26:
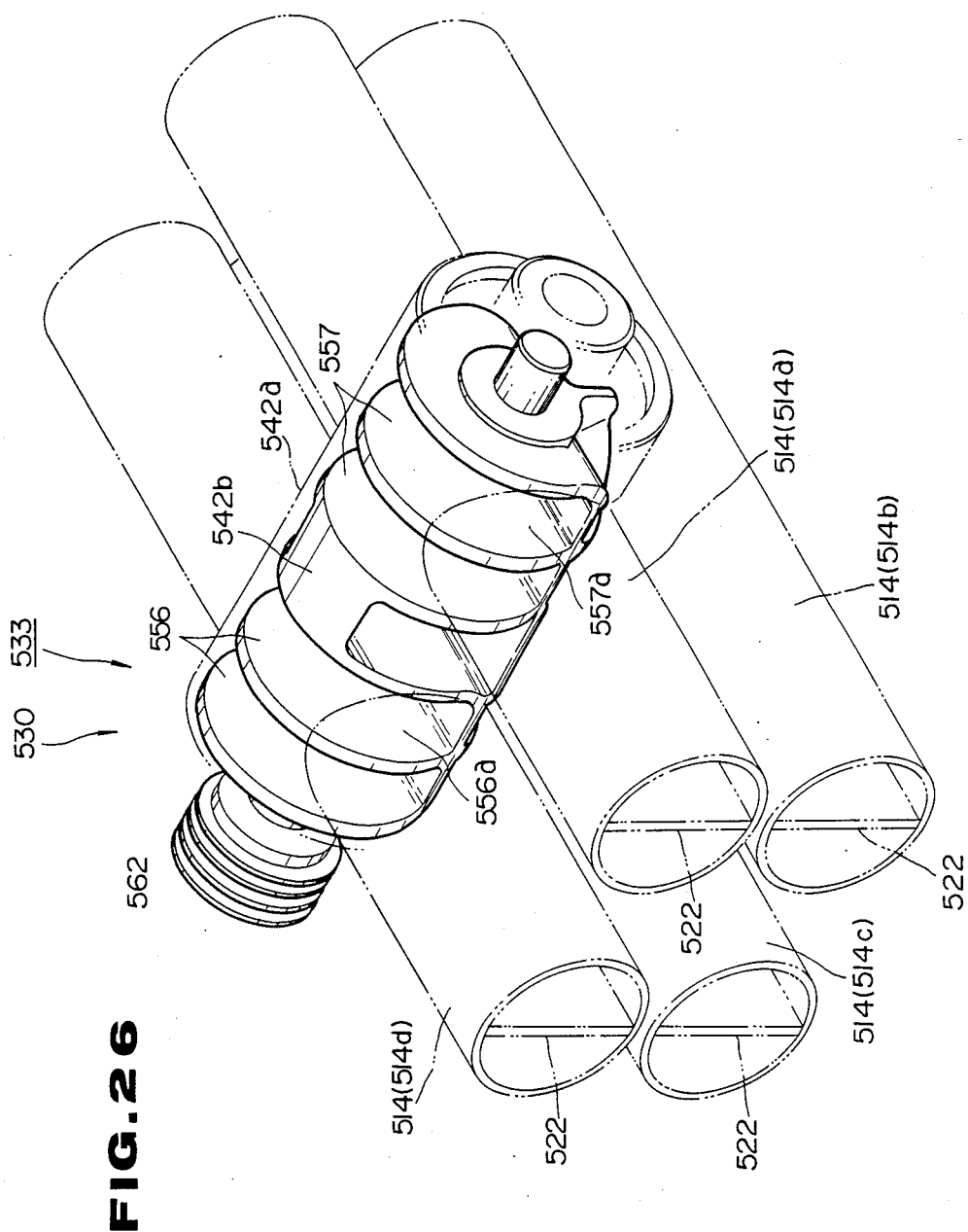
FIG. 26 is a perspective view of the change valve of FIG. 24.
Figure 27:
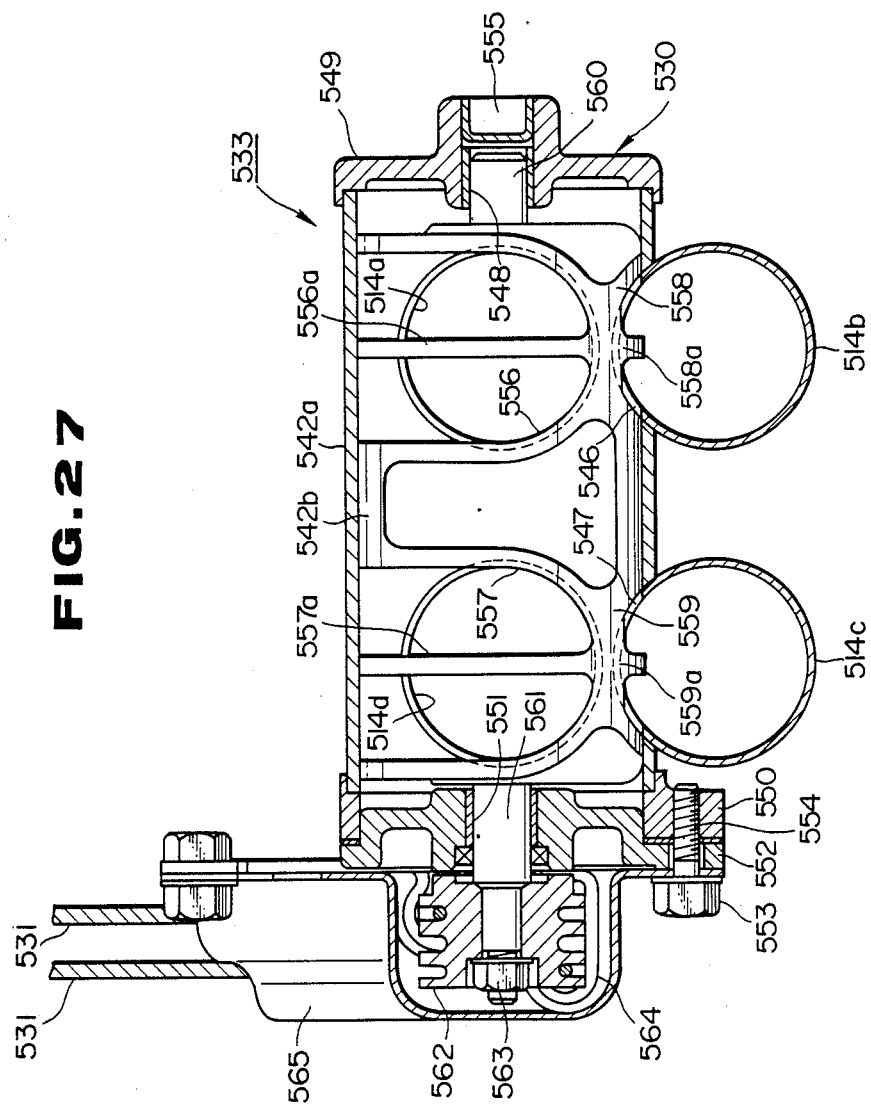
FIG. 27 is a vertical sectional elevation of the change valve of FIG. 24.

The change valve 530, as shown in FIG. 24, is mounted under the engine 307 between the pipe junctions 519, 520 and the engine 307, and equipped, is as shown in FIGS. 26 and FIG. 27, with a cylindrical casing 542a and valve 542 inserted in the casing for free rotation around the axis of the casing 542a.

The casing 542a has inlets and outlets connected with No. 1 exhaust pipe 514a and No. 4 exhaust pipe 514d, and the lower part of the casing 542a, has holes 446 and 547 formed, as shown in FIG. 27, open to the holes in the No. 2 exhaust pipe 514b and No. 3 exhaust pipe 514c. The exhaust pipes 514 and casing 542a are tightly connected with each other by brazing or welding etc. so there are no leaks.

On one end of casing 542a in the length direction is fixed cover 549 housing a bearing 548, and, on the other end, is fixed a ring shaped fixture 550, on which cover 552 is installed housing bearing 551 and attached by bolt 553, and gasket 554 is positioned between the fixture 550 and cover 552 to seal them.

In addition, the cap 555 is inserted from outside for sealing around the location of bearing 548 in cover 549. The valve 542 is in air tight contact as shown in FIG. 27, with the full internal arc of casing 542 and it forms two independent passages 556 and 557 which allow flow through the valve 542 transverse to the axial direction of the valve 542. In the center of the passages are connected, partitions 556a and 557a which line up with the partition 522 of the exhaust pipes 514, and on the walls of the valve 542 opposite the passages are sealing parts 558 and 559 to open and close the through holes 546 and 547. The sealing parts 558 and 559 are composed of concavities 558a and 559a which line up with each internal arc of No. 2 exhaust pipe 514b and No. 3 exhaust pipe 514c when each of through holes 546 and 547 are closed.

At both ends of the valve 542b, shafts 560 and 561 are mounted protruding in the axial direction. These shafts 560 and 561 are inserted for free rotation on each of the bearings 548 and 551 for supporting valve 442b for free rotation inside the casing 542a.

In addition, shaft 561 which is supported by bearing 551, projects through lid 552 out of casing 542a, and wire drum 562, around which wire 531 is wound around the projected end, is detachably fixed by nut 563.

Two lengths of wire 526 and 531 are installed. These wires can rotate the plate valve 523 and valve 542b in either direction by pulling the appropriate wire. The wires 531 are kept at a certain distance from each other by the guide plate 564 and covered with cover 565. The guide plate 564, cover 565 and cover 552 are secured from both sides to the fixture 550 with the bolt 553. The actuator 527 is mounted on the motor cycle in a way similar to the actuator 324 of the third embodiment shown in FIG. 16.

Information related to the degree of opening of the throttle valve $C_o$ in carburetor C of FIG. 16 is constantly input as electric signals into the control unit 528 so that the drive signal may be sent to the actuators 527 and 532 to control the operational positions of plate valve 523 and change valve 530 based on the throttle opening information, when the throttle valve reaches a set degree of opening.

Although the actuators 527 and 532 are operated, based on the opening change of the throttle valve $C_o$ as a function of the rpm change of the engine 307 in this example, it is also possible to have instead or in addition to the above, the actuators operated, based on direct detection of the rpm change of the engine 307.

Figure 29:
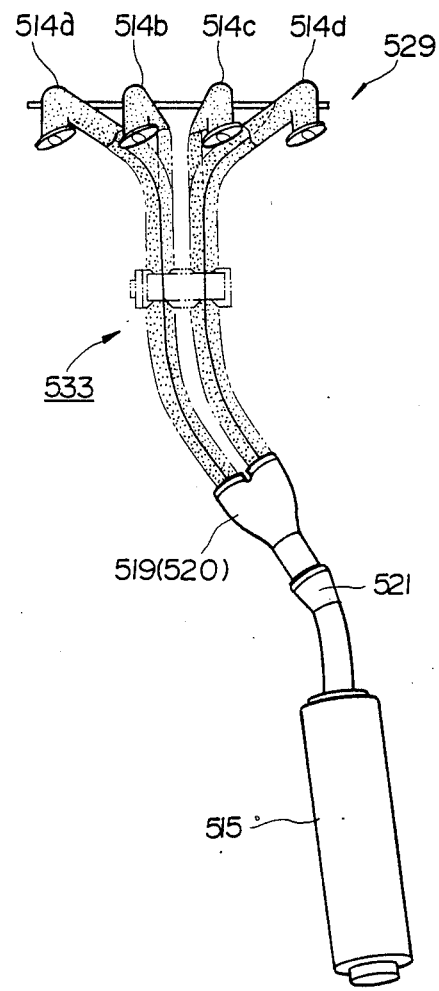
FIG. 29(a)—(c) show the the exhaust system flow when the engine is in the middle speed range.
Figure 30:
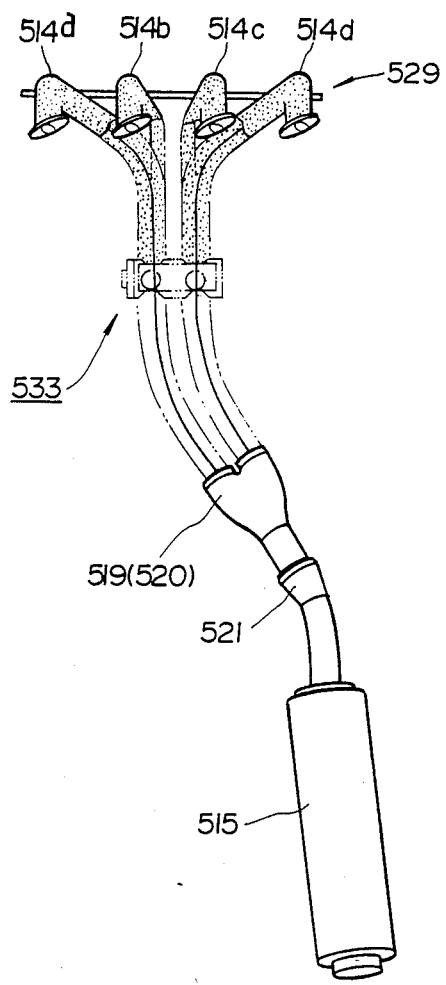
FIG. 30(a)—(c) show the the exhaust system flow when the engine is in the high speed range.

Three operating condictions of the variable exhauster of this preferred embodiment are shown in FIGS. 28, 29, 30.

When the rpm of the engine changes, the appropriate condition is selected depending on the degree of opening of the throttle valve $C_o$ at the particular rpm.

When the rpm of the engine is the low range, only the space 524 on one side will be utilized as an exhaust passage, closing the space 524 of the other side of the exhaust pipes 514, so that the plate valve 523 through operation of the actuator 527 is inclined to contact the partition wall 522 as shown in FIG. 28b. At this time, inclining the plate valve 523 at an acute angle against the exhaust gas flow has the advantage that it can provide a smooth gas flow without producing much turbulence.

At the same time when the plate valve 523 is operated, valve 542b is rotated by the actuator 532, so that the holes 545 and 547 of the casing 542a are closed by the closing parts 558 and 559 to keep each exhaust pipe 514 514a-514d independent of the other pipe, as shown in FIG. 28c, and the continuous length of the independent exhaust pipes is from the engine 307 to the junction pipe 519 for No. 1 exhaust pipe 514a and No. 4 exhaust pipe 514d, and from the engine 307 to the junction pipe 520 for No. 2 exhaust pipe 514b and No. 3 exhaust pipe 514c.

This state gives a long exhaust passage so that the volumetric efficiency in the low/middle rpm range is increased by the dynamic pulse effect between the exhaust pipes 514 from cylinders with a 360° ignition phase difference. That is cylinders No. 1 and No. 4, and cylinders No. 2 and No. 3 respectively.

On the other hand, when the rpm of the engine reaches the low/middle rpm range, the drive signal is sent from the control unit 528 to the actuator 527 based on the information, and the plate valve 523, as shown in FIG. 29, is rotated so that the valve 523 is parallel to the partition wall 522.

In such a condition the right and left spaces 524 and 524y of the exhaust pipes 514 become exhaust passages. Therefore the equivalent pipe length of the exhaust pipes 514 remains the same but the effective cross-sectional area of the exhaust pipes 514 is increased to provide optimum pulse effect of the exhausts when the engine is in the middle rpm range.

Furthermore, when the rpm of the engine 307 reaches the high rpm range, based on sensor information, the drive signal is be sent from the control unit 528 to the actuator 532 and the valve 542b of the change valve 530 is be rotated 180°, as shown in FIG. 30c.

In such a condition, No. 1 exhaust pipe 514a and No. 2 exhaust pipe 514b, and No. 4 exhaust pipe 514d and No. 3 exhaust pipe 514c are respectively connected by the passages parts 556 and 557 of the valve 552b, so that the exhaust pipes 514, corresponding to the cylinders with 180° ignition phase difference, are connected at a short distance to give an effective dynamic pulse effect to improve the volumetric efficiency in the high rpm range.

Comparing the power characteristic of the engine 307 in the present example with the power characteristic of a conventional internal combustion engine with an exhaust system of fixed shape and dimensions, it can be confirmed that the present invention increases the power over a wide rpm range from the low rpm to high rpm and produces the flat high power characteristic.

If the position of the throttle valve $C_o$ is changed suddenly, the state of the equipment will be changed from that of FIG. 28 to that of FIG. 30 or, on the contrary, from that of FIG. 30 to that of FIG. 28, and the marked change in the state of the exhaust system may drop the power temporarily. To protect against such a drop, it is desirable that the circuit in the control unit should be arranged so that the operating state changes to the state shown in FIG. 30 or FIG. 28 after some time has elapsed with the state of FIG. 28 first changing to that of FIG. 29 or the state of FIG. 30 to that of FIG. 29.

It should be noted that the shapes, dimensions, etc. given for the components in this preferred embodiment are just one example and that it is quite possible to change them according to circumstances including design requirements.

For example, although the example combines the exhaust pipe combination change method and method to change the effective pipe length together with the method to change the effective cross sectional area, they can be installed as separate systems or it is possible that either one of them can be installed with the method to change the effective cross-sectional area of the exhaust pipe.

In addition, in the example a four cylinder, in line type internal combustion engine is considered, but the present invention is not be limited to that type, and can naturally be applied to a variety of multiple cylinder-type internal combustion engines.

As described in the foregoing, this preferred embodiment is characterized by the fact that it is equipped with a method of changing the exhaust pipe combination configuration and cross-sectional area to obtain the dynamic pulse effect from the exhaust gases when the engine is in the low/middle or high rpm range.

This invention is effective in improving the performance of a multi-cylinder internal combustion engine over a wide range of engine speeds to various degrees depending on the complexity of the system.

The methods of this invention enable the exhaust pipes from a multi-cylinder internal combustion engine to be combined in different combinations and at different lengths while the engine is running to use the dynamic effect of the pulses in the exhaust pipes to assist in the extraction of exhaust gases from the cylinders and thereby improve the volumetric efficiency of the engine and enable a higher maximum rpm. By varying the combinations and lengths of exhaust pipes from cylinders at 180° ignition timing difference and cylinders at 360° ignition timing difference, the optimum combination of exhaust pipes to obtain the maximum benefit from the dynamic pulses in the exhaust flows, can be obtained for engine speed ranges from low speed to high speed.

A further improvement is achieved with the fourth preferred embodiment wherein the cross-sectional area of the exhaust pipe can also be varied so that an exhaust system that makes efficient use of the exhaust gas pulse effect over an even smaller engine speed range is possible, and by using a control system with sensors connected to the throttle as well as to the motor cycle speed sensor, gear change lever and engine rpm sensor, the system is also able to maintain its performance during various states of throttle opening and operating conditions.

Also, positioning the exhaust pipe combination change valve between the fixed combination point of the exhaust pipes and the engine, and locating it so it is protected from damage from the ground overcomes the problems encountered with other configurations and makes the system suitable for use with motorcycles.

What is claimed is:

1. An exhaust system for multi-cylinder internal combustion engines, the exhaust system comprising:
    (a) an exhaust pipe connected at one end to each of the cylinders for receiving exhaust gas therefrom;
    (b) a collector means connected with the other end of the exhaust pipes for receiving exhaust gas therefrom, said collector means including means for interconnecting the exhaust pipes in different combinations therein, and for varying the location at which the exhaust pipes are interconnected;
    (c) means for sensing a plurality of operational conditions of the internal combustion engine; and
    (d) a control means operated in response to said sensing means for controlling said interconnecting means for altering the combination of the exhaust pipes to be interconnected and the location of the interconnection, whereby the effective length of the respective exhaust pipes and combination thereof is altered according to operational conditions of the internal combustion engine.

2. An exhaust system according to claim 1 wherein the collector means for connecting the exhaust pipes from the different cylinders comprises a valve plate which can be rotated from a first position where all the pipes are connected together to a second position where pipes of cylinders at 180 phase difference are connected together, and means for rotating the valve plate between said positions.

3. An exhaust system according to claim 1 wherein the engine has four cylinders ignited with 180° phase difference with respect to each other, said exhaust pipes being arranged in two pairs and each of the two pairs of exhaust pipes join into a single flow at one of an upstream portion or a midstream portion of the collector means, then the flows join into a single flow at a downstream portion.

4. An exhaust system according to claim 3 including means for moving the collector means selectively between a first position and a second position, the exhaust pipes having 180° of phase difference having joined together at the upstream portion when the collector means is at the first position, the exhaust pipes having 360° of phase difference being joined together at the midstream portion when the collector means is at the second position.

5. An exhaust system according to claim 3, including means for moving the collector means selectively between the first position and the second position, the exhaust pipes having 180° of phase difference being joined together at the midstream portion when the collector means is at the first position, the exhaust pipes having 360° of phase difference being joined together at the upstream portion when the collector means is at the second position.

6. An exhaust system according to claim 3 wherein the exhaust pipes communicate with respective quadrants at the entrance to the collector means, the collector means is in a cylindrical form having an axis and comprises:
    (a) a pair of first valve plates disposed in the collector means rotatable about the axis, the first valve plates being capable of movement to one of the first to third positions said first position being a position wherein both of the valve plates are at an upright position, said second position being a position wherein one of the valve plates is at the upright position and the other valve plate is at a horizontal position, and said third position being a position wherein both of the valve plates are at a horizontal position; and
    (b) a second valve plate disposed in the collector means downstream side of the first valve plates rotatable about the axis, the second valve plate being capable of selectively taking one of an upright position and an horizontal position,
    whereby a pair of left exhaust pipes are joined together and a pair of right exhaust pipes are joined together at the upstream portion of said collector means when the first valve plates are at the first position, said exhaust pipes being kept separated at the upstream portion when the first valve plates are at the second position, and a pair of upper exhaust pipes being joined together and a pair of lower exhaust pipes being joined together at the upstream portion when the first valve plates are at the third position.

7. An exhaust system according to claim 3 wherein the exhaust pipes communicate with respective quadrants at the entrance to the collector means, the collector means is in a cylindrical form having an axis and comprises:
  (a) a pair of ridges formed inside the upstream portion of the collector means for separating an inner space thereof into left and right spaces;
  (b) a first valve plate disposed in the upstream portion of the collector means supported rotatable about the axis, the first valve plate being capable of selectively taking one of an upright and a horizontal positions;
  (c) a flow regulator disposed in the collector means on a down stream side of the first valve plate, the flow regulator comprising upright fins and horizontal fins for separating the inside space of the collector means into four portions; and
  (d) a second valve plate disposed in the collector means on a downstream side of the flow regulator supported rotatable about the axis, the second valve plate being capable of selectively taking one of an upright and a horizontal position.

8. An exhaust system for multi-cylinder internal combustion engines, the exhaust system comprising:
  (a) exhaust pipes connected to the cylinders for receiving exhaust gas therefrom;
  (b) a diverter valve means connected with the exhaust pipes positionally adjustable at a mid portion thereof, the diverter valve means having means for interconnecting the exhaust pipes in different combinations;
  (c) a manifold means attached to downstream ends of the exhaust pipes for receiving exhaust gas therefrom; and
  (d) a control means for controlling the position of said diverter valve means in response to operational conditions of the engine; whereby the effective length of the exhaust pipes and the combinations thereof are altered according to operational conditions of the internal combustion engine.

9. An exhaust system according to claim 8 wherein the diverter valve means is disposed beneath the internal combustion engine.

10. An exhaust system according to claim 8 wherein the diverter valve means is disposed beneath and forward of the internal combustion engine.

11. An exhaust system according to claim 1 which further comprises valve means for varying the area of the exhaust pipes.

12. An exhaust system according to claim 8 wherein the diverter valve means further comprises a control valve means for varying the area of the exhaust pipes.

13. A method for controlling exhaust gas from internal combustion engines, the method comprising steps of:
  (a) providing a collector means connected with exhaust pipes for receiving exhaust gas therefrom, the collector means communicating the exhaust pipes in different combinations, and varying the location at which the exhaust pipes are communicated;
  (b) controlling the collector means for varying the combination of the exhaust pipes to be communicated and the location of the communication in accordance with operational conditions of the internal combustion engine.

14. A method for controlling exhaust gas according to claim 13 wherein operational condition of the internal combustion engine is categorized into at least three categories and the control of the collector means is performed on the basis of the categories.

15. A method for controlling exhaust gas according to claim 14 wherein the operational condition of the internal combustion engine is categorized according to the engine speed.

16. A method for controlling exhaust gas according to claim 14 wherein the engine has four cylinders ignited with 180° phase difference one to the other, and the collector means is so controlled according to the operational conditions that collector means selectively move to one of a first position or a second position, the exhaust pipes having 180° of phase difference being joined together at the upstream portion when the collector means is at the first position and the exhaust pipes having 360° of phase difference being joined together at the midstream portion when the collector means is at the second position.

17. A method for controlling exhaust gas according to claim 14 wherein the engine has four cylinders ignited with 180° phase difference one to the other, and the collector means is so controlled according to the operational conditions that collector means selectively move to one of a first position or a second position, the exhaust pipes having 180° of phase difference being joined together at the midstream portion when the collector means is at the first position, and the exhaust pipes having 360° of phase difference being joined together at the upstream portion when the collector means is at the second position.

18. An exhaust system for multi-cylinder internal combustion engine comprising:
  (a) a plurality of exhaust pipes connected each at one end to one of said cylinders for receiving exhaust gas therefrom;
  (b) a collector means connected the other end of said exhaust pipes including:
  (c) a casing defining a chamber having an inlet end and an outlet end;
    (i) means closing the inlet end of said casing and having means for communicating the other ends of said exhaust pipes with said chamber;
    (ii) means within said casing for selectively dividing said chamber into passages communicating with the other end of said exhaust pipes individually or in groups; and
    (iii) means for operating said chamber dividing means in response to engine operating conditions, whereby the effective length of the respective exhaust pipes is selectively controlled.

19. An exhaust system according to claim 18 in which said collector means includes manifold means downstream of said collector chamber, said manifold having means dividing its interior into a plurality of flow passages.

20. An exhaust system according to claim 19 in which said manifold interior dividing means is fixed.

21. An exhaust system according to claim 19 in which said manifold interior dividing means is variable.

* * * * *